(12) United States Patent
Abe et al.

(10) Patent No.: US 8,498,489 B2
(45) Date of Patent: Jul. 30, 2013

(54) IMAGE INSPECTION APPARATUS

(75) Inventors: Yuichi Abe, Mito (JP); Mitsuji Ikeda, Hitachinaka (JP); Yoshimichi Sato, Hitachi (JP); Yasutaka Toyoda, Mito (JP)

(73) Assignee: Hitachi High-Technologies Corporation, Tokyo (JP)

( * ) Notice: Subject to any disclaimer, the term of this patent is extended or adjusted under 35 U.S.C. 154(b) by 221 days.

(21) Appl. No.: 12/920,724

(22) PCT Filed: Apr. 16, 2009

(86) PCT No.: PCT/JP2009/057662
§ 371 (c)(1),
(2), (4) Date: Nov. 19, 2010

(87) PCT Pub. No.: WO2009/128505
PCT Pub. Date: Oct. 22, 2009

(65) Prior Publication Data
US 2011/0110597 A1  May 12, 2011

(30) Foreign Application Priority Data

Apr. 16, 2008  (JP) .................................. 2008-106847

(51) Int. Cl.
*G06K 9/62* (2006.01)
*G06K 9/00* (2006.01)

(52) U.S. Cl.
USPC ............................ 382/209; 382/141; 348/125

(58) Field of Classification Search
USPC ..................... 382/151, 22, 145, 260, 157, 30
See application file for complete search history.

(56) References Cited

U.S. PATENT DOCUMENTS

| | | | | |
|---|---|---|---|---|
| 4,581,762 A | * | 4/1986 | Lapidus et al. | 382/263 |
| 5,444,798 A | * | 8/1995 | Enomoto et al. | 382/199 |
| 5,625,707 A | * | 4/1997 | Diep et al. | 382/157 |
| 5,835,614 A | * | 11/1998 | Aoyama et al. | 382/104 |

(Continued)

FOREIGN PATENT DOCUMENTS

JP  2008-65458  3/2008

OTHER PUBLICATIONS

M. Hashimoto et al., "High Speed Template Matching Algorithm Using Information of Contour Points," IEICE Transactions, vol. J74-D2, No. 10. pp. 1419-1427, Section 2.2, Oct. 1991, w/ partial English translation thereof.

(Continued)

*Primary Examiner* — Manav Seth
(74) *Attorney, Agent, or Firm* — McDermott Will & Emery LLP

(57) ABSTRACT

The present invention provides a unified template matching technique which allows an adequate matching position to be provided even in an image with a distorted pattern shape and a variation in edge intensity. A correlation value contribution rate map is created for the vicinity of each of top candidate positions obtained by applying a centroid distance filter to a normalized correlation map resulting from template matching. A corrected intensity image is created from the correlation value contribution rate maps. Luminance correction is performed based on the corrected intensity image. Local matching is performed again on the vicinity of each candidate position. The candidates are then re-sorted based on candidate positions and correlation values newly obtained. Thus, even in an image with a distorted pattern shape and a variation in edge intensity, an adequate matching position can be provided in a unified manner.

6 Claims, 25 Drawing Sheets

U.S. PATENT DOCUMENTS

| | | | | |
|---|---|---|---|---|
| 5,982,940 | A  * | 11/1999 | Sawada | 382/260 |
| 6,298,157 | B1 * | 10/2001 | Wilensky | 382/199 |
| 6,628,833 | B1 * | 9/2003 | Horie | 382/173 |
| 6,798,923 | B1 * | 9/2004 | Hsieh et al. | 382/284 |
| 6,920,249 | B2 * | 7/2005 | Rinn et al. | 382/199 |
| 6,993,184 | B2 * | 1/2006 | Matsugu | 382/173 |
| 7,095,884 | B2 * | 8/2006 | Yamaguchi et al. | 382/145 |
| 7,272,268 | B2 * | 9/2007 | Perlmutter et al. | 382/294 |
| 7,369,703 | B2 * | 5/2008 | Yamaguchi et al. | 382/199 |
| 8,077,962 | B2 * | 12/2011 | Toyoda et al. | 382/145 |
| 2003/0179921 | A1 * | 9/2003 | Sakai et al. | 382/151 |
| 2008/0069453 | A1 | 3/2008 | Abe et al. | |

OTHER PUBLICATIONS

A. Rosenfeld et al., *Digital Picture Processing*, "Chapter 8.3: Matching", pp. 296-315.

\* cited by examiner

FIG. 2
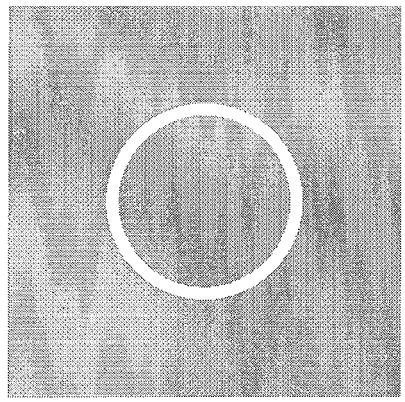
A  Template selection image
   = Template
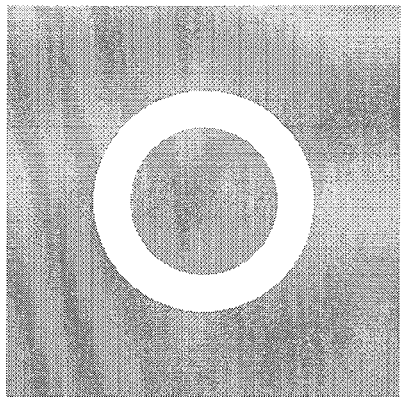
D  Image obtained by
   thickening edges in template
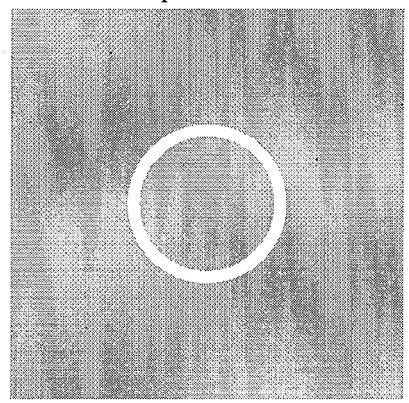
B  Search image
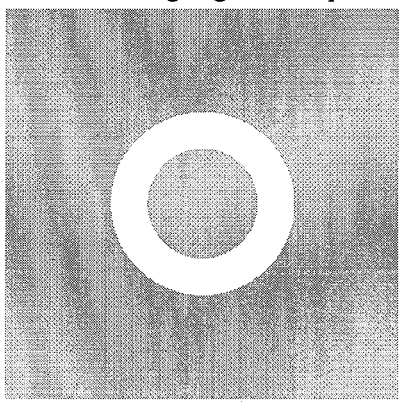
E  Image obtained by thickening
   edges in search image
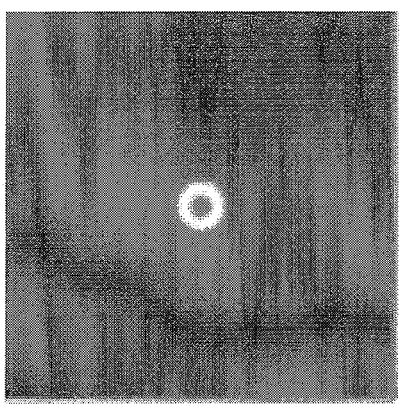
C  Normalized correlation map
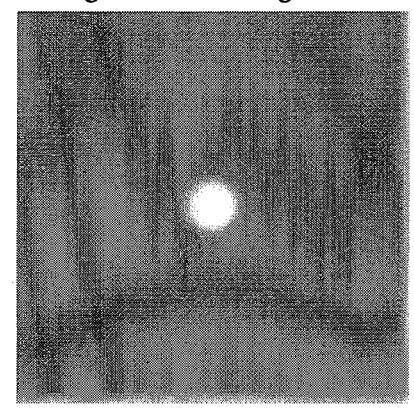
F  Normalized correlation map
   resulting from thickened edges FIG. 3
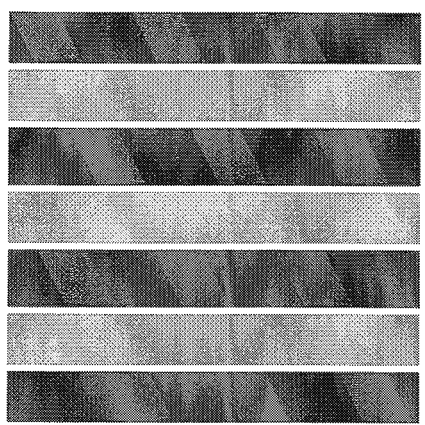
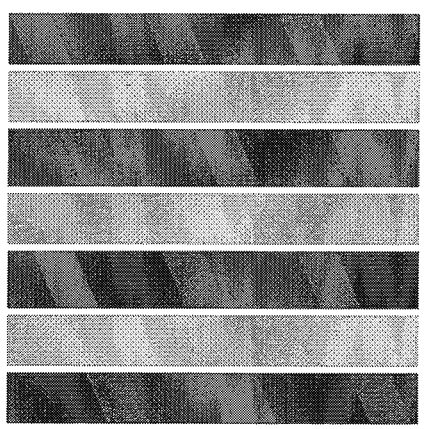
A  Template selection image = Template
B  Search image
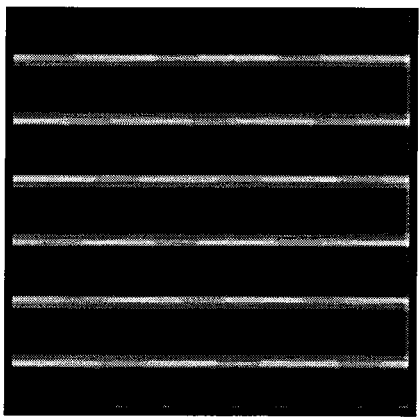
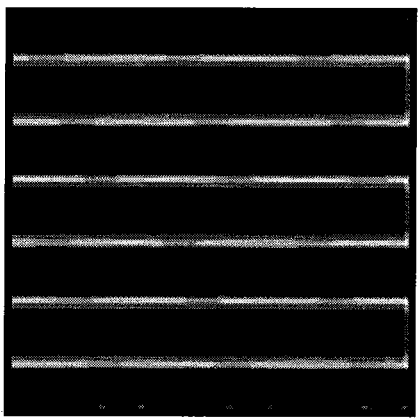
C  Edge image of template
D  Edge image of search image FIG. 4
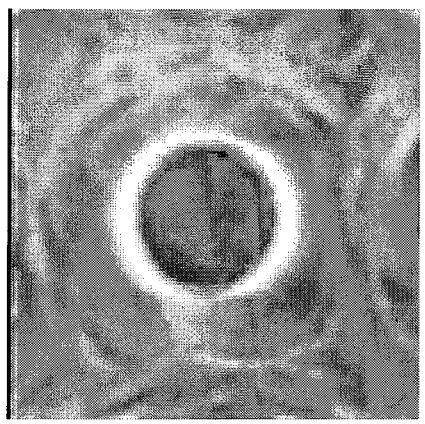
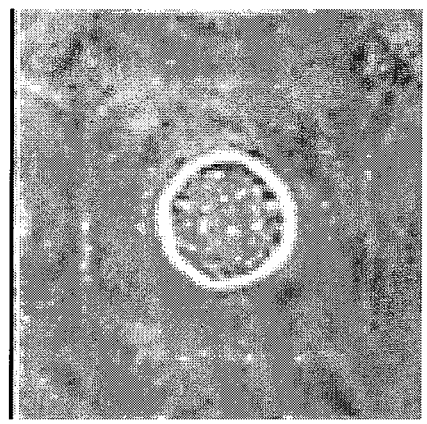
A  Template selection image = Template
B  Search image
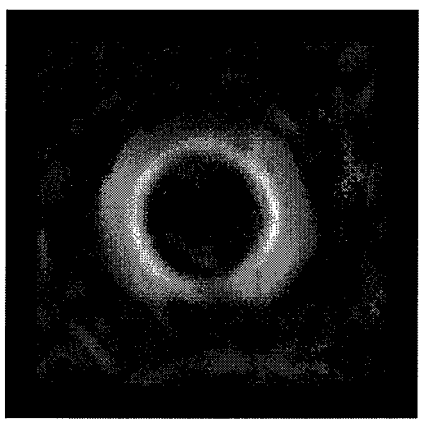
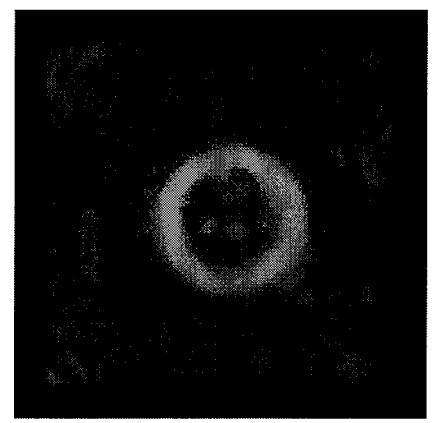
C  Edge image of template
D  Edge image of search image

FIG. 6

| | Candidate position | Correlation value contribution rate map | Template luminance corrected image | Search image luminance corrected image | Highest candidate |
|---|---|---|---|---|---|
| First candidate | Coordinates | Image | Image | Image | Coordinates |
| Second candidate | Coordinates | Image | Image | Image | Coordinates |
| ⋮ | ⋮ | ⋮ | ⋮ | ⋮ | ⋮ |

Column headers (top labels pointing down): Candidate position storage section, Correlation value contribution rate map storage section, Template luminance corrected image storage section, Search image luminance corrected image storage section, Highest candidate storage section

- 701 Create edge images
- 702 Edge expansion process
- 703 Template matching
- 704 Extract top candidates
- 705 Create correlation value contribution rate map for each candidate position
- 706 Perform luminance corrected matching on vicinity of each candidate position
- 707 Sort highest candidate group A  Non-integrated image   B  24-integrated image   C  16-integrated image Correct matching position (a) Template   (b) Search Image   (c) Correlation value contribution rate map

A      B

A  Normalized correlation map

B  Image obtained by applying centroid distance filter to normalized correlation map Maximum value position A  Template selection image
   = Template B  Search image FIG. 30
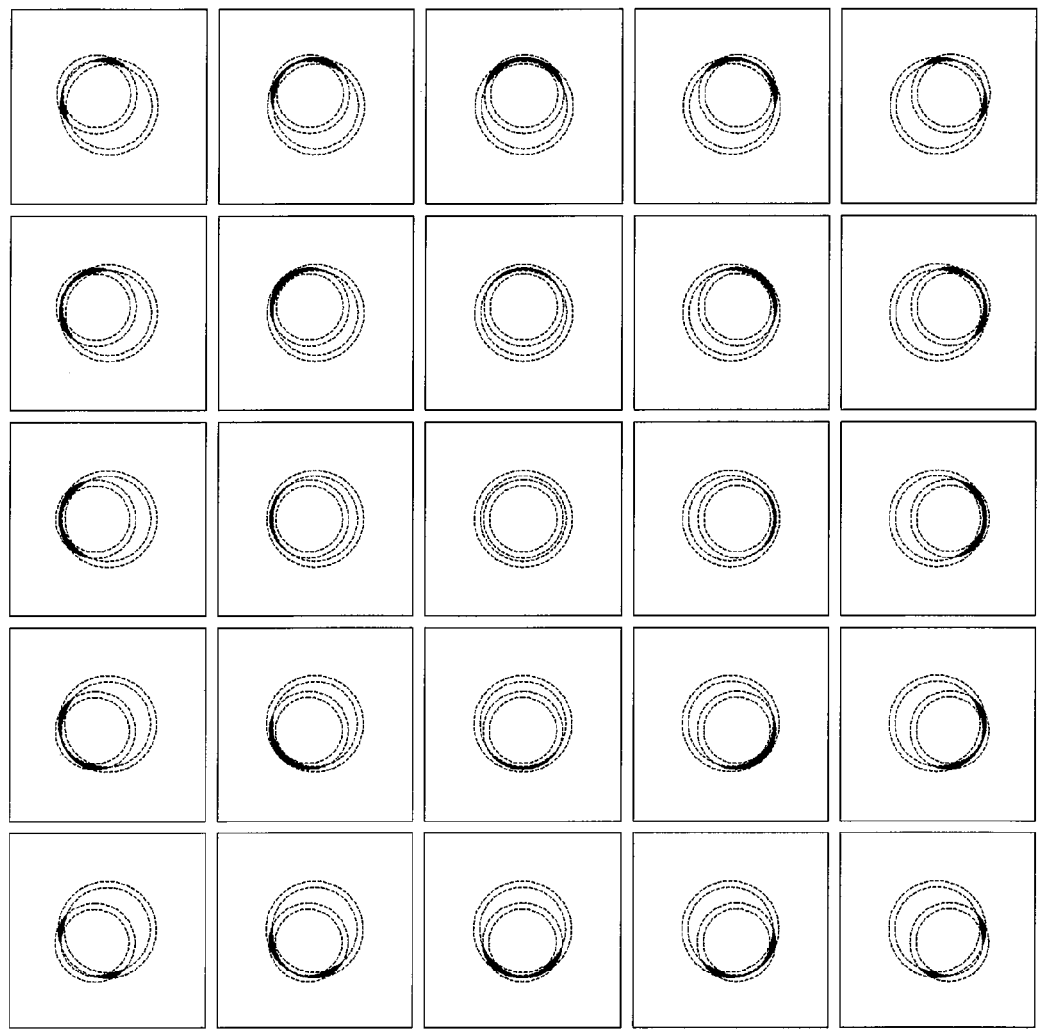
A  Correlation value contribution rate map
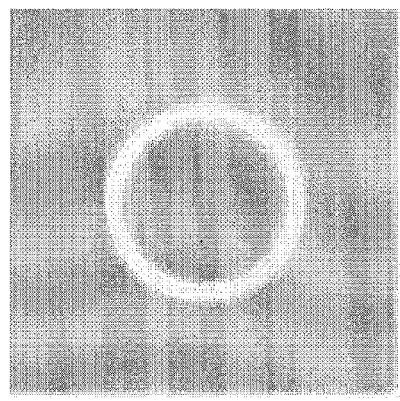
B  Corrected intensity image

FIG. 31
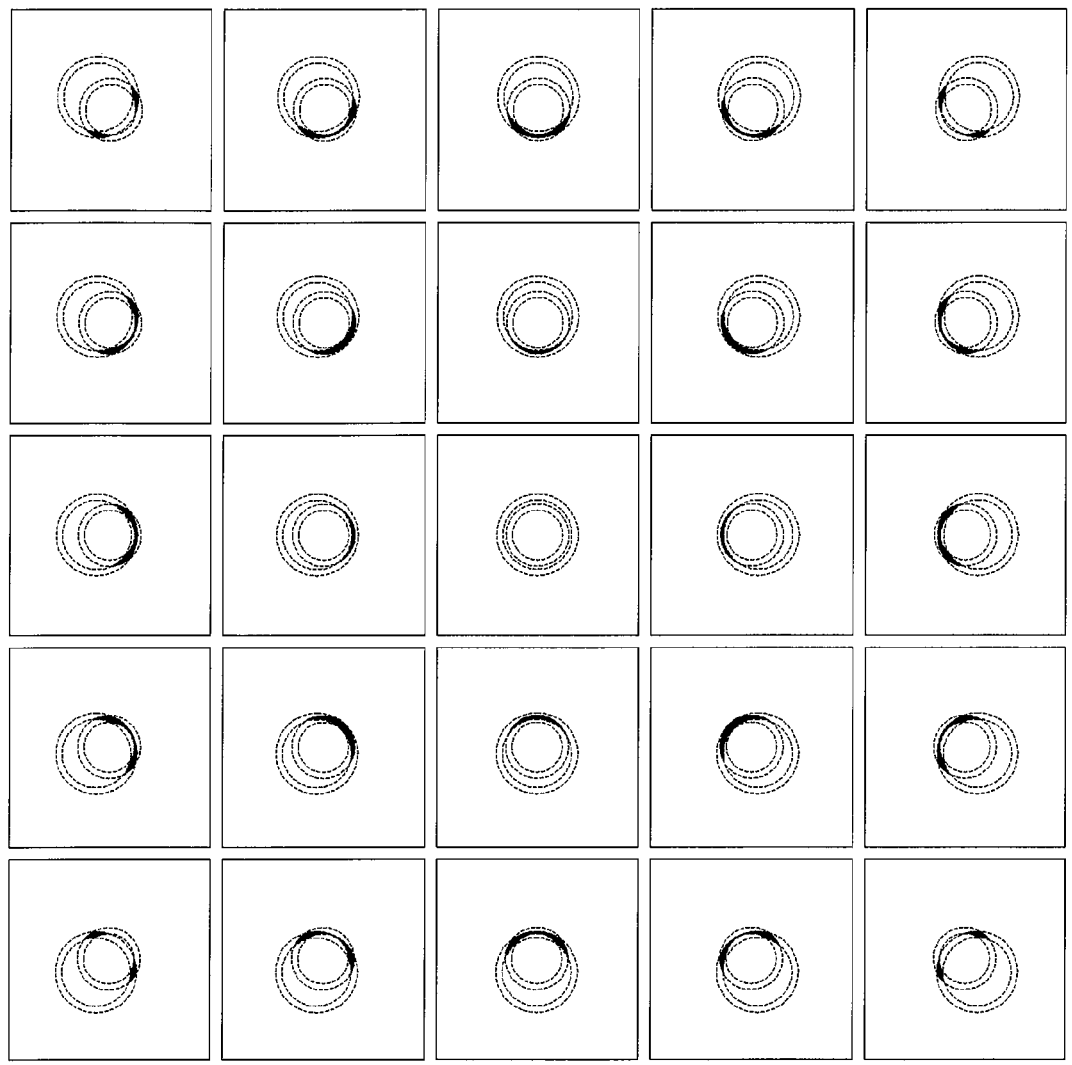
A  Correlation value contribution rate map
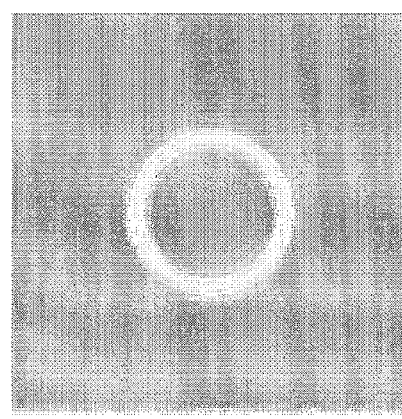
B  Corrected intensity image FIG. 32
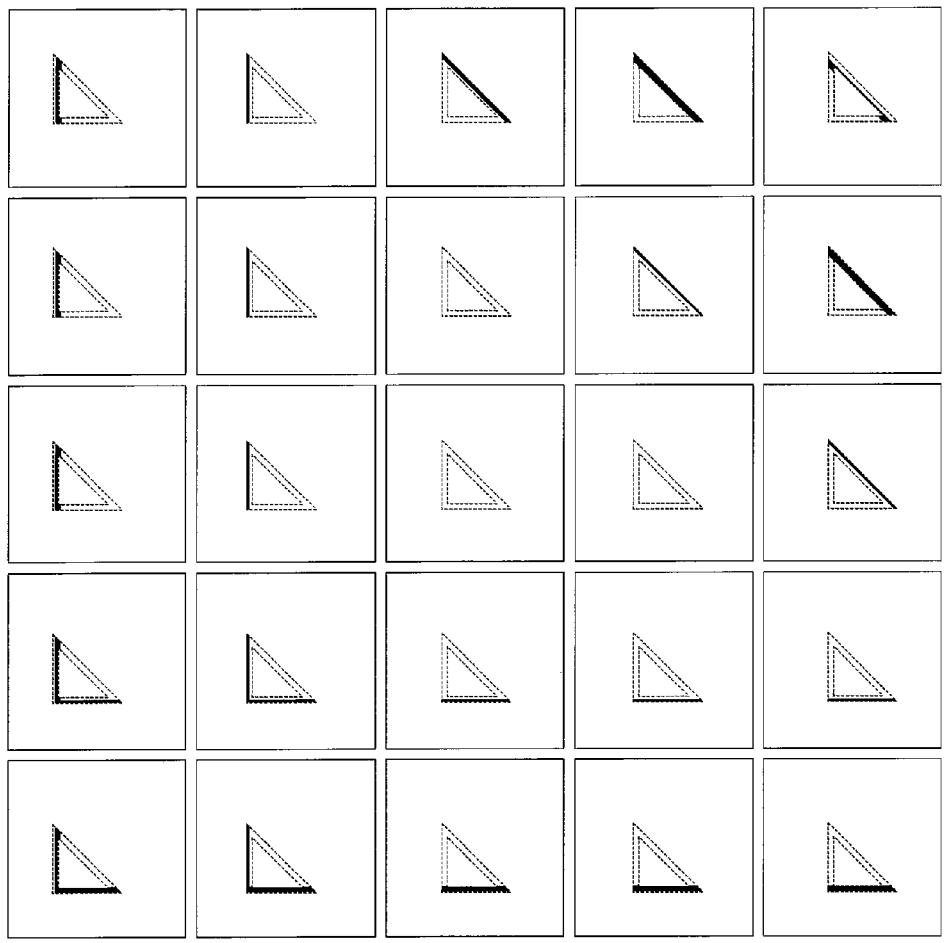
A  Correlation value contribution rate map
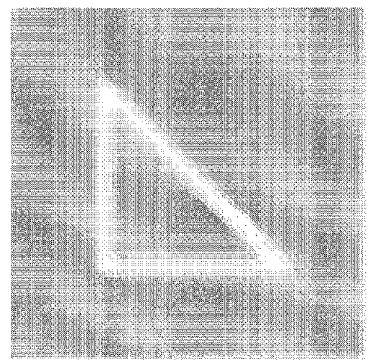
B  Corrected intensity image

IMAGE INSPECTION APPARATUS

This application is the U.S. National Phase under 35 U.S.C. §371 of International Application No. PCT/JP2009/057662, filed on Apr. 16, 2009, which in turn claims the benefit of Japanese Application No. 2008-106847, filed on Apr. 16, 2008, the disclosures of which Applications are incorporated by reference herein.

TECHNICAL FIELD

The present invention relates to an image inspection apparatus, and for example, to an apparatus such as a semiconductor inspection apparatus which performs template matching for image inspection.

BACKGROUND ART

A technique for searching for a particular shape (template) provided in a target image has been widely used as template matching (see Non-Patent Document 1).

In measurement of a pattern on a semiconductor wafer using a scanning electron microscope, the template matching is also performed in order to determine a measurement position. Alignment with the measurement position is roughly carried out by moving a stage with the wafer loaded thereon. However, the positioning accuracy for the stage may lead to a significant misalignment on an image taken by an electron microscope at a high magnification. The template matching is performed in order to correct the misalignment to allow measurement to be carried out at an accurate position. Specifically, a unique pattern located close to the measurement pattern is registered as a template, and the coordinates of the measurement position relative to the template are stored. To determine the measurement position based on the taken image, the template matching is performed on the taken image to determine a matching position. Then, the matching position is moved by a distance corresponding to the stored relative coordinates to determine the measurement position.

FIG. 1 is a diagram illustrating the template matching in the scanning electron microscope. First, an image of the measurement position of an object (FIG. 1A) is taken. A unique pattern contained in the image is registered as a template. The taken image (FIG. 1B) is hereinafter referred to as a template selection image. The unique pattern (FIG. 1C) selected from the template selection screen is referred to as a template. Then, when an image of another object (FIG. 1D) (FIG. 1D may show another location with the same pattern on the same wafer as those in FIG. 1A, for example, the same portion of dies repeatedly formed on the same wafer, or a location with the same pattern on a different wafer) is taken, the taken image is searched for a pattern matching the template. The taken image (FIG. 1E) is hereinafter referred to as a search image. Misalignment corresponding to a positioning error in the stage may occur between the template selection image B and the search image (FIG. 1E). The misalignment is corrected by the template matching. As a result of the template matching, locations with high similarity (correlation) to the corresponding location on the template are determined to be candidates for a matching position. One of the candidates which is most likely to be a matching position is determined to be the final matching position.

In measurement of a pattern on a semiconductor wafer using a scanning electron microscope, if pattern shapes fail to be uniformly formed, the template matching needs to be performed on distorted patterns. This is because the improved micromachining of semiconductors has made formation of the same shape with high reproducibility difficult. In such a case, possible slight distortion between the template pattern and the target pattern in the search image needs to be tolerated during the template matching (the patterns can be recognized to match each other in spite of the distortion).

An image of a pattern on a semiconductor wafer taken by a scanning electron microscope is formed of edges. That is, it is important to determine how boundaries between areas with almost the same luminance or white edges called white bands are arranged.

In this connection, for example, Non-Patent Document 2 discloses that stable matching is implemented by thickening (expanding) edge images in the template matching thereof to tolerate distortion such as scaling. FIG. 2 shows the template matching in which the template and the search image are images of ring-shaped white bands with different radii and the template matching in which the white bands are thickened. In FIG. 2A, the template is the entire template selection image of the ring-shaped white band with the large radius. In FIG. 2B, the search image is the ring-shaped white band with a radius smaller than that in FIG. 2A. When the template matching is performed on FIG. 2B using FIG. 2A as a template, the resultant normalized correlation map is shaped like a ring as shown in FIG. 2C. Thus, the center of the ring (the center of the distortion) cannot be determined to be a matching position (the position with the maximum normalized correlation value, that is, with the maximum luminance in the normalized correlation map). In contrast, when the template matching is performed on image diagrams 2D and 2E in which the white bands in FIGS. 2A and 2B are thickened, the resultant normalized correlation map shows a circle the center of which is brightest as shown in FIG. 2F. Thus, the center of the ring can be determined to be the matching position.

Non-Patent Document 1: Digital Picture Processing authored by Azriel Rosenfeld and Avinash C. Kak, see Section 8.3

Non-Patent Document 2: "High-speed Template Matching Algorithm Using Contour Point Information", IEICE Transactions, Vol. J74-D2, No. 10, pp. 1419-1427, Section 2.2

DISCLOSURE OF THE INVENTION

Problems to be Solved by the Invention

As described above, thickening edges allows the template matching to be achieved in such a manner that a certain level of distortion is tolerated.

However, if high-intensity (high-luminance) edges and low-intensity (low-luminance) edges are mixed, the appropriate template matching may not be achieved simply by thickening the edges.

FIG. 3 shows a pattern on a semiconductor wafer in which high-intensity edges and low-intensity edges are mixed. FIG. 3A shows a template, and FIG. 3B shows a search image. Both images show high-intensity edges in a lateral direction and low-intensity edges in an oblique direction. Furthermore, the oblique lines in FIG. 3A have a width different from that of the oblique lines in FIG. 3B. FIGS. 3C and 3D are edge images created by applying a differential filter to FIGS. 3A and 3B, respectively. In these images, the lateral edges have a high intensity, and slight bends of the lateral edges and the like are thus registered, preventing the oblique, low-intensity edges from being properly aligned. Effective means for avoiding this case is to carry out luminance correction such that the low-intensity edges are emphasized. However, the luminance correction may disadvantageously emphasize noise.

FIG. 4 shows an example in which the luminance correction for emphasizing the low-intensity edges affect the template matching. The regular pattern is only the ring-like shape in the center of the figure. The spots inside the ring and surrounding gather-like pattern are noise. The ring-like pattern in the template has a slightly larger radius than that in the search image. In this case, the matching is successfully carried out simply by thickening the edges. However, when the luminance correction is carried out so as to emphasize the low-intensity edges, the noise is emphasized, resulting in a failure.

As described above, the luminance correction leads to a positive outcome in some cases and to a negative outcome in other cases. A unified solution has not been developed yet.

The present invention has been made in view of these circumstances. An object of the present invention is to provide an inspection apparatus which allows an adequate matching position to be provided even in an image with a distorted pattern shape and a variation in edge intensity.

Means for Solving the Problems

To accomplish the above-described object, the present invention creates a correlation value contribution rate map for top candidates for a matching position obtained by template matching between edge images, performs luminance correction based on the correlation value contribution rate map, performs local matching again on a vicinity of each candidate position, and re-sorts candidates based on candidate positions newly obtained and correlation values. Edge images are preferably thickened (an edge expansion process is carried out).

Furthermore, the present invention creates a correlation value contribution rate map for the vicinity of each of top candidate positions obtained by applying a centroid distance filter to a normalized correlation map obtained by template matching between non-thickened edge images (not subjected to an edge expansion process), creates a corrected intensity image from the correlation value contribution rate map, performs luminance correction based on the corrected intensity image, performs local matching again on a vicinity of each candidate position, and re-sorts candidates based on candidate positions and correlation values newly obtained.

That is, the present invention provides an image inspection apparatus which acquires a template and a search image and performs template matching on the search image, the apparatus including an edge image generation section which generates edge images of the template and the search image, a template matching processing section which performs template matching using the edge images of the template and the search image, a correlation value contribution rate map generation section which generates a correlation value contribution rate map indicating a portion contributing to achieving similarity between the template and the search image, for each of candidate positions in a plurality of matching results obtained by the template matching, a luminance correction section which corrects luminance of the template and the search image based on the correlation value contribution rate maps, a local matching processing section which performs local matching again on a vicinity of each of the candidate positions in the matching results using the template and search image subjected to the luminance correction, and a sorting processing section which sorts the plurality of matching results based on the candidate positions and correlation values newly obtained by the local matching process.

The image inspection apparatus further includes an edge expansion processing section which carries out an expansion process on the edge images of the template and the search image. The template matching processing section performs the template matching using the template and search image subjected to the edge expansion process.

Furthermore, the correlation value contribution rate map generation section selects a predetermined number of the plurality of matching results which have top normalized correlation values, to generate a correlation value contribution rate map.

Moreover, the correlation value contribution rate map generation section generates a correlation value contribution rate map indicating a portion of each of the edge images of the template and the search image which has a pixel value equal to or larger than a predetermined value.

In the correlation value contribution rate map, a pixel in a portion contributing to the similarity indicates a first value (for example, "1"). A pixel in a portion irrelevant to the similarity indicates a second value (for example, "0"). In this case, the luminance correction section corrects the pixel value indicative of the first value in the correlation value contribution rate map to increase the luminance of edge portions in the template and search image which portions have low luminance.

Another aspect of the present invention provides an image inspection apparatus which acquires a template and a search image and performs template matching on the search image, the apparatus including an edge image generation section which generates edge images of the template and the search image, a template matching processing section which performs template matching using the edge images of the template and the search image, a centroid distance filter processing section which carries out a centroid distance filter process on a normalized correlation map obtained by the template matching, a top candidate extraction section which extracts, from results of the centroid distance filter process, candidate positions shown to have normalized correlation values higher than a predetermined value in a plurality of matching results obtained by the template matching, a correlation value contribution rate map generation section which generates, for each of the candidate positions, a correlation value contribution rate map indicating a portion contributing to achieving similarity between the template and the search image, a luminance correction section which corrects luminance of the template and the search image based on the correlation value contribution rate maps, a local matching processing section which performs local matching again on a vicinity of each of the candidate positions in the matching results using the template and search image subjected to the luminance correction, and a sorting processing section which sorts the plurality of matching results based on the candidate positions and correlation values newly obtained by the local matching process.

Further features of the present invention will be clarified by the best mode for carrying out the invention and the attached drawings.

Advantage of the Invention

The present invention allows an adequate matching position to be provided even in an image with a distorted pattern shape and a variation in edge intensity.

BRIEF DESCRIPTION OF THE DRAWINGS

FIG. 2 is a diagram showing template matching in which a template and a search image are images of ring-shaped white bands with different radii and template matching in which the white bands are thickened.

FIG. 3 is a diagram showing a pattern on a semiconductor wafer in which high-intensity edges and low-intensity edges are mixed.

FIG. 4 is a diagram showing an example in which luminance correction for emphasizing low-intensity edges affects template matching.

FIG. 6 is a diagram showing the type of data stored in each storage section for each candidate.

FIG. 30 is a diagram showing a correlation value contribution rate map (1) created by using a large ring-shaped edge and a small ring-shaped edge as a template and a search image, respectively, and shifting relative positions around a first candidate position.

FIG. 31 is a diagram showing a correlation value contribution rate map (2) created by using a large ring-shaped edge and a small ring-shaped edge as a template and a search image, respectively, and shifting relative positions around a first candidate position.

FIG. 32 is a diagram showing a correlation value contribution rate map group (1) for a first candidate position in a template with a small triangular edge and a search image with a large triangular edge.

DESCRIPTION OF SYMBOLS

Figure 1:
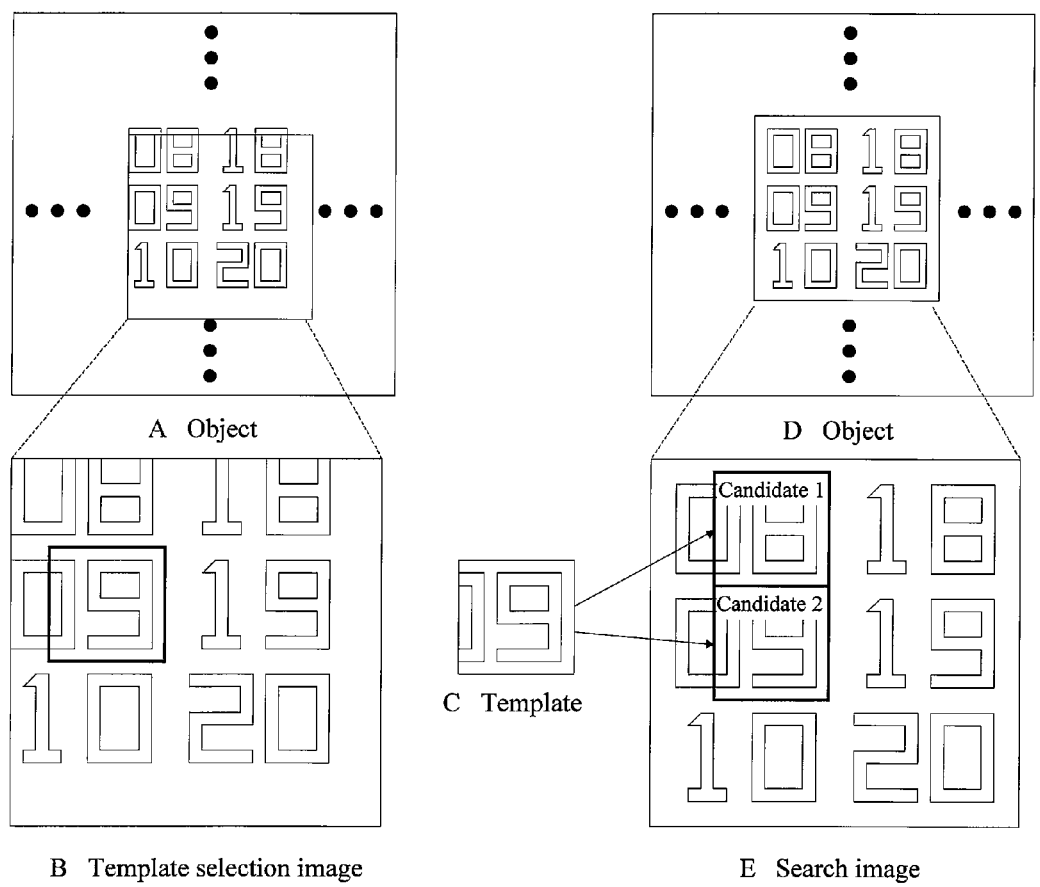
FIG. 1 is a diagram illustrating template matching in a scanning electron microscope.

50 . . . inspection apparatus, 51 . . . processing section, 52 . . . storage section, 53 . . . RAM, 54 . . . ROM, 55 . . . display apparatus, 230 . . . inspection apparatus, 231 . . . processing section, 232 . . . storage section, 233 . . . RAM, 234 . . . ROM, 235 . . . display apparatus

BEST MODE FOR CARRYING OUT THE INVENTION

Embodiments of the present invention will be described below with reference to the drawings. However, it should be noted that the present embodiment is only an example in which the present invention is implemented and is not intended to limit the technical scope of the present invention. Furthermore, in the drawings, common components are denoted by the same reference numerals.

(1) First Embodiment

<Configuration of the Inspection Apparatus>

Figure 5:
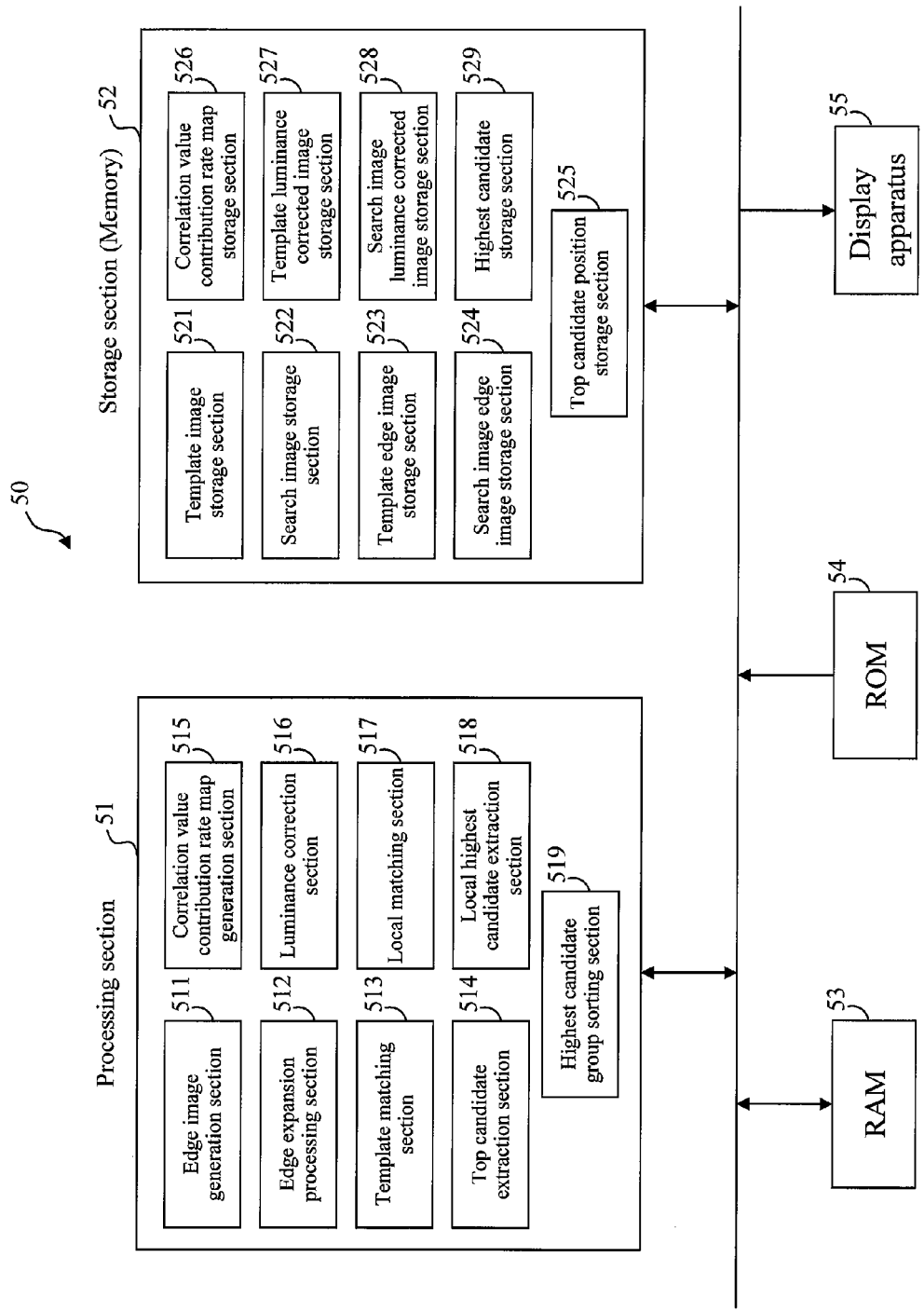
FIG. 5 is a diagram schematically showing the configuration of an inspection apparatus according to a first embodiment of the present invention.

FIG. 5 is a diagram schematically showing the configuration of an inspection apparatus according to a first embodiment of the present invention. FIG. 5 does not show the configuration of an electron microscope. Provided that the inspection apparatus 50 can store images acquired by the electron microscope, as search images, the electron microscope need not be connected directly to the inspection apparatus 50.

The inspection apparatus 50 includes a processing section 51 formed of, for example, an MPU or a CPU to carry out various processes, a storage section 52 which stores the results of processes carried out by the processing section 51, a RAM (Random Access Memory) 53 which temporarily stores data, a ROM (Read Only Memory) 54 which stores process programs and parameters for the processing section 51, and a display apparatus 55 which displays inspection results and images.

The processing section 51 includes an edge image generation section 511 which generates edge images of a template image and a search image, an edge expansion processing section 512 which applies an edge expansion process to both edge images, a template matching section 513 which performs template matching, a top candidate extraction section 514 which extracts a predetermined number of matching results with top normalized correlation values from template matching results, a correlation value contribution rate map generation section 515 which generates correlation value contribution rate maps, a luminance correction section 516 which performs luminance correction on the template image and search image subjected to the expansion process based on the correlation value contribution rate maps, a local matching section 517 which carries out a local matching process on the image subjected to the luminance correction for each position extracted as the top candidate, a local highest candidate extraction section 518 which extracts the highest candidate in the local matching results, as the highest candidate, and a highest candidate group sorting section 519 which sorts the obtained highest candidates to determine the final matching position.

The storage section 52 includes a template image storage section 521 which stores a template image, a search image storage section 522 which stores a search image, a template edge image storage section 523 which stores a template edge image, a search image edge image storage section 524 which stores an edge image of the search image, a top candidate position storage section 525 which stores positional information on top candidates, a correlation value contribution rate map storage section 526 which stores correlation value contribution rate maps, a template luminance corrected image storage section 527 which stores the template image subjected to luminance correction, a search image luminance corrected image storage section 528 which stores the search image subjected to luminance correction, and a highest candidate storage section 529 which stores the highest candidate.

The edge image generation section 511 acquires the template and the search image from the template image storage section 521 and the search image storage section 522, respectively, and creates edge images of the template and the search image. The edge expansion processing section 512 carries out an edge expansion process on each of the edge images and stores the edge images in the template edge image storage section 523 and the search image edge image storage section 524.

The template matching section 513 performs template matching on the edge image stored in the search image edge image storage section 524, using the edge image stored in the template edge image storage section 523 as a template.

The top candidate extraction section 514 stores top ones of the candidates resulting from the template matching process, in the top candidate position storage section 525.

The correlation value contribution rate map generation section 515 uses the edge image stored in the template edge image storage section 523 and the edge image stored in the search image edge image storage section 524 to create a correlation value contribution rate map corresponding to each of the candidate positions stored in the top candidate position storage section 525. The correlation value contribution rate map generation section 515 then stores the correlation value contribution rate map in the correlation value contribution rate map storage section 526. The generation of a correlation value contribution rate map will be described below.

The luminance correction section 516 creates a template luminance corrected image for each candidate from the correlation value contribution rate map and the edge image stored in the template edge image storage section 523. The luminance correction section 516 then stores the template luminance corrected image in the template luminance corrected image storage section 527. Furthermore, the luminance correction section 516 creates a search image luminance corrected image for each candidate from the correlation value contribution rate map and the edge image stored in the search image edge image storage section 524. The luminance correction section 516 then stores the search image luminance corrected image in the search image luminance corrected image storage section 528.

The local matching section 517 uses the template luminance corrected image as a template to perform local template matching on the search image luminance corrected image around the candidate position.

The local highest candidate extraction section 518 stores the highest candidate resulting from the local template matching, in the highest candidate storage section 529 as the highest candidate.

The highest candidate group sorting section 519 re-sorts all the local highest candidates obtained for and located around each candidate to determine the final matching position.

As shown in FIG. 6, for each of the candidates obtained by the top candidate extraction section 514, coordinates and images are stored in the top candidate position storage section 525, the correlation value contribution rate map storage section 526, the template luminance corrected image storage section 527, the search image luminance corrected image storage section 528, and the highest candidate storage section 529.

<Contents of Operation of the Processing Section>

An image taken by a camera or the electron microscope or the temporarily stored image is input to the storage section 52 (template image storage section 521) as a template selection image. A template is cut out from the template selection image. The template is stored in the storage section until template matching is performed on the search image.

Furthermore, the search image is an image taken by the camera or the electron microscope or the temporarily stored image and on which the template matching is performed.

Figure 7:
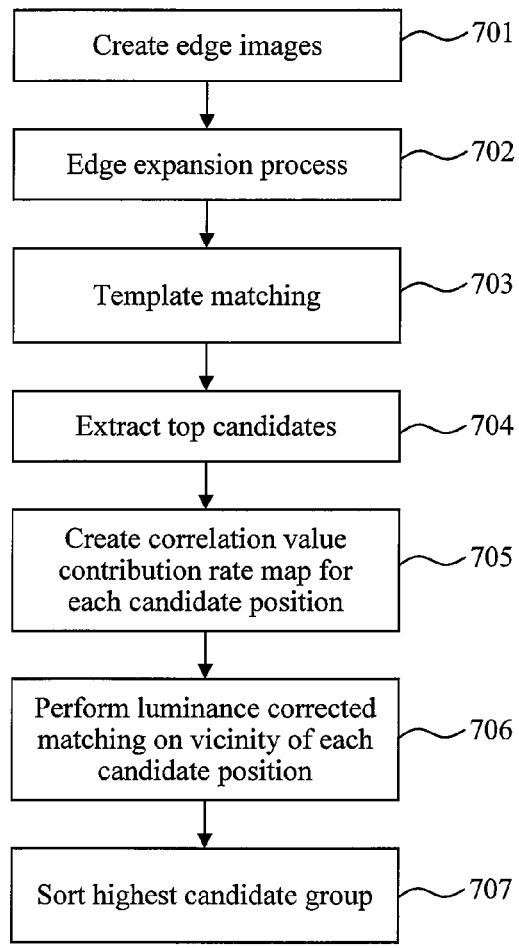
FIG. 7 is a flowchart illustrating the operation of the inspection apparatus according to the first embodiment in brief.

Now, the process will be described in brief with reference to FIG. 7. FIG. 7 is a flowchart illustrating the operation of an inspection apparatus according to a first embodiment of the present invention in brief.

First, the edge image generation section 511 generates edge images of a template and a search image (step S701). The edge images are obtained by application of a filter with an edge extraction function such as a Sobel filter or a Laplacian filter. Then, the edge expansion processing section 512 applies an expansion process to the edge images of the template and the search image (step S702). The expansion process can be implemented by a maximum filter which sets the maximum pixel value in a kernel to be a new value for a pixel of interest or a low pass filter such as a Gaussian filter.

Subsequently, the template matching section 513 carries out a matching process between the template image and search image subjected to the expansion process (step S703). At this time, a correlation value (indicative of similarity) is obtained at a plurality of positions. Then, the top candidate extraction section 514 extracts those of the plurality matching positions obtained which have correlation values larger than a predetermined value, as top candidates (step S704).

The correlation value contribution rate map generation section 515 generates a correlation value contribution rate map for each of the top candidate positions (step S705). The generation of the correlation value contribution rate map will be described below in detail. Then, the luminance correction section 516 performs luminance correction on the template and the search image based on the correlation value contribution rate maps. The local matching section 517 performs pattern matching between the template and search image both subjected to the luminance correction (step S706).

The local highest candidate extraction section 518 determines the highest candidate resulting from the local template matching to be the highest candidate. The highest candidate group sorting section 519 re-sorts all the local highest candidates obtained for and located around each candidate to determine the final matching position (step S707).

The steps of the template matching process and the subsequent process will be described below in detail.

<Template Matching Process>

Figure 8:
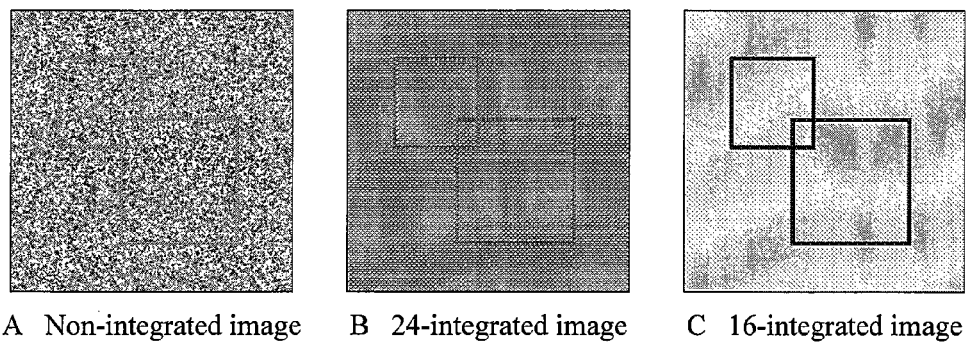
FIG. 8 is a diagram illustrating a preprocess carried out before the template matching is performed.

An actual preprocess is carried out before the template matching is performed. FIG. 8 shows the preprocess, that is, the figure shows scanning electron microscope images input as, for example, a template selection image and a search image. The scanning electron microscope images involve a very large amount of noise. If no measure is taken for the images, the patterns are buried in the noise and are difficult to read (see FIG. 8A). Thus, the same image is taken a number of times and the taken images are integrated (see FIGS. 8B and 8C). The pattern information remains unvaried among the images, whereas the noise varies randomly among the images. Thus, the integration reduces the noise to make the pattern clear.

Now, the template matching will be described below with reference to FIG. 9. FIG. 9A shows a search image, and FIG. 9B shows a template (reference image). Here, the template matching refers to a process of detecting the same portion as that of the template, in the search image. Specifically, for example, the process involves calculating the normalized correlation between the template and the search image with the template placed on top of the search image in a misaligned manner and determining a location with the highest correlation value to have the same pattern as that of the template.

A CD-SEM is an inspection apparatus which uses a scanning electron microscope to measure the length of a particular site on a semiconductor wafer. To specify the site on the wafer to be subjected to length measurement, the CD-SEM registers a portion of the first wafer located near the length measurement site and including a unique pattern, as a template, when performing the length measurement on the first wafer. The next time the CD-SEM performs the length measurement on the same site, the CD-SEM species the length measurement site based on coordinates obtained through template matching.

Figure 9:
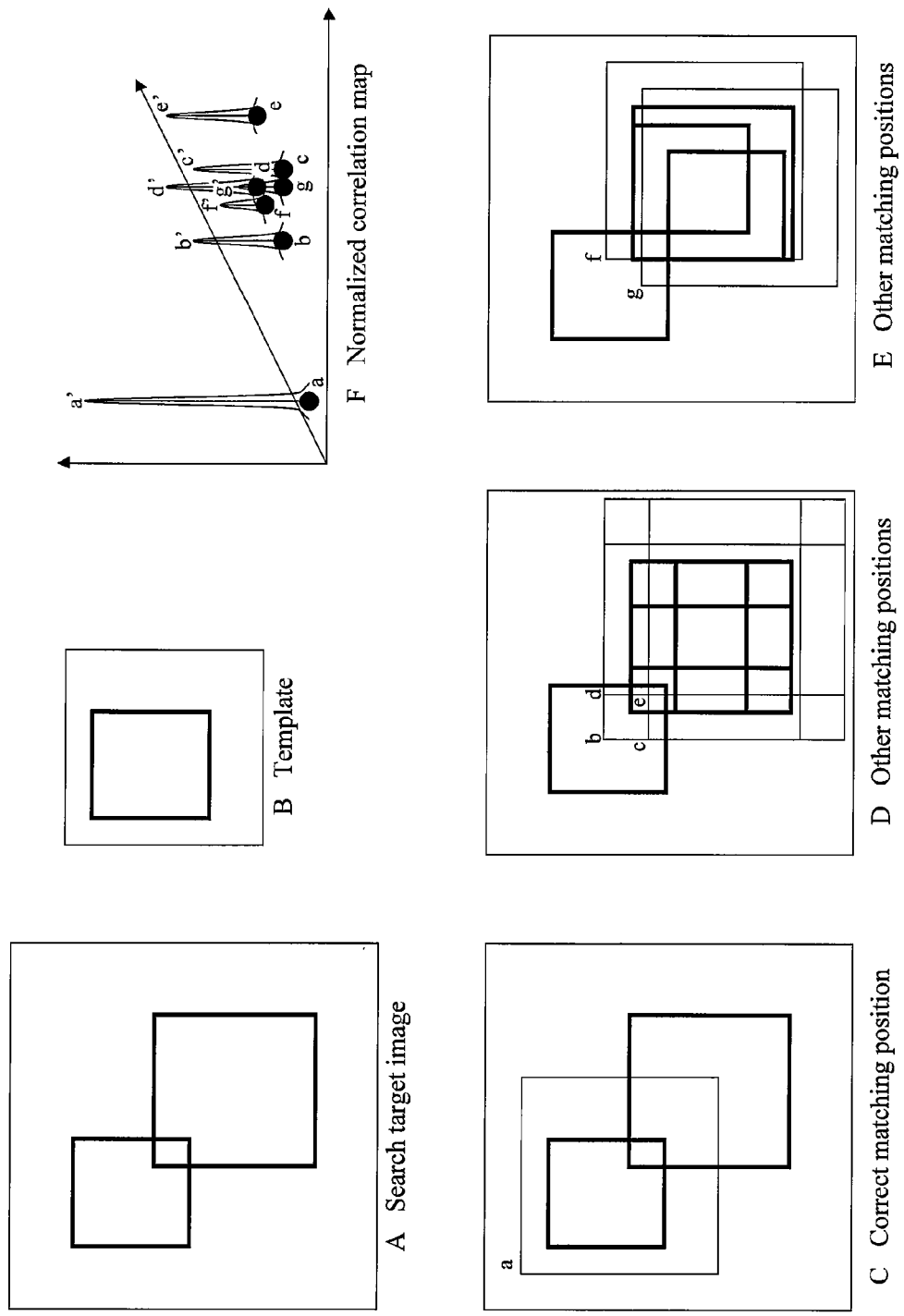
FIG. 9 is a diagram showing a search image and a template (reference image) in template matching.

In FIG. 9, the search image includes the same pattern as that of the template at a position (a). Furthermore, a pattern with the next highest correlation value, which is not the same as that of the template, is present at four positions b, c, d, and e in FIG. 9D. Moreover, a pattern with the further next highest correlation value is present at positions f and g in FIG. 9E. At the other positions, almost no correlation is observed, and the correlation value is close to zero. FIG. 9F shows a normalized correlation map in which a correlation value for each coordinate pair is specified as a pixel value. The image has a value a' closer to 1 at the position (a). The image has values b', c', d', e', f, and g' lower than the value a' at the positions b, c, d, e, f, and g.

Figure 10:
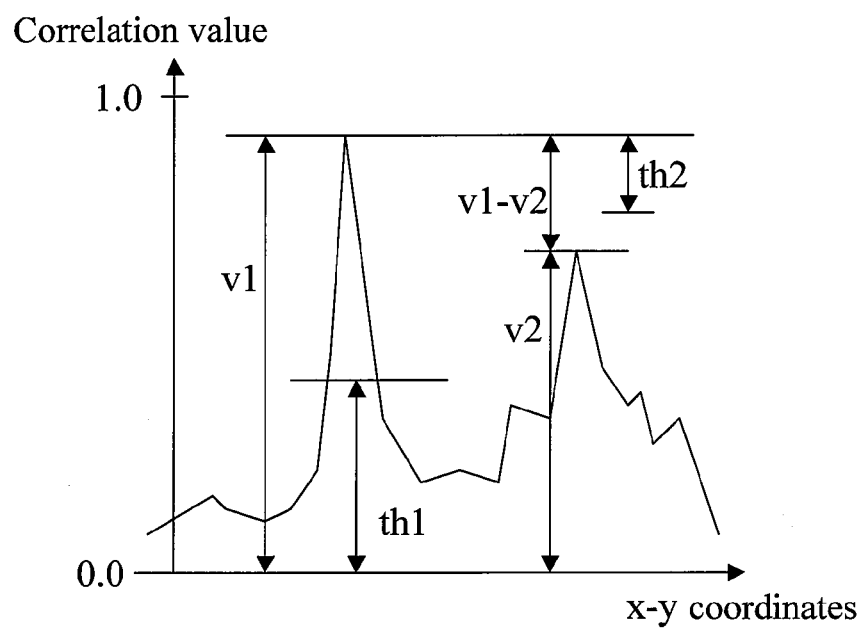
FIG. 10 is a diagram showing an example in which a matching position is determined based on a correlation value contribution rate map.

FIG. 10 shows an example in which a matching position is determined based on a normalized correlation map. The axis of abscissas indicates x-y coordinates. The axis of ordinate indicates a correlation value. A position with the largest correlation value indicates the best matching with the template. It is proper to determine that the image does not match the template at any positions if the maximum correlation value v1 is smaller than a predetermined threshold value th1. Furthermore, if the difference v1−v2 between the second largest correlation value v2 and the maximum correlation value v1 is smaller than a predetermined threshold value th2, the matching position may be determined based on the magnitude of the sum of surrounding correlation values instead of the magnitude of the correlation value. This is because if the pattern shape is distorted, the correlation value has no high peak but the surrounding correlation values are generally high.

A predetermined number (k) of a plurality of matching positions resulting from the template matching are selected and determined to be top candidates; the predetermined number of matching positions have top correlation values in the normalized correlation map. This is expected to increase processing speed (improve throughput) because not all the matching positions need to be processed.

<Correlation Value Contribution Rate Map Generation Process>

Figure 11:
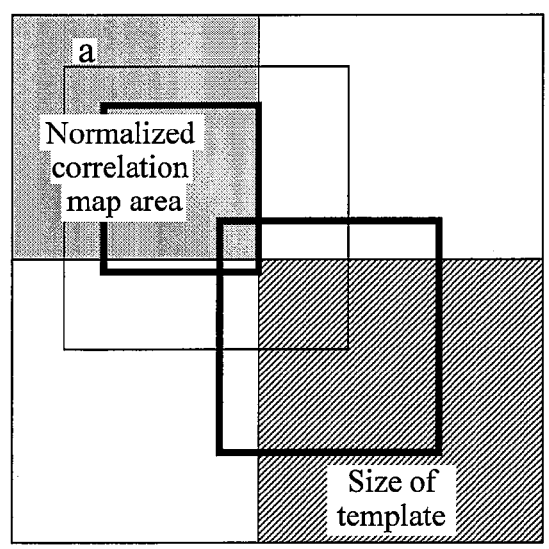
FIG. 11 is a diagram showing a normalized correlation map area and the size of a correlation value contribution rate map obtained if the template is smaller than the search image and if normalized correlations are calculated for the entire size of the template.
Figure 12:
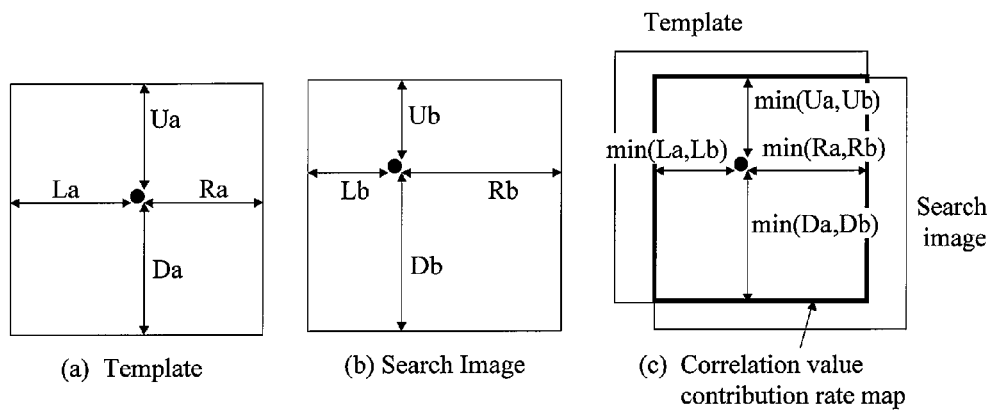
FIG. 12 is a diagram showing the normalized correlation map area and the size of the correlation value contribution rate map obtained when the template and the search image are the same in size and if the normalized correlation is calculated only for a portion in which the template and the search image overlap.

FIGS. 11 and 12 show a normalized correlation map area and the size of a correlation value contribution rate map. The correlation value contribution rate map is an image in which the similarity between corresponding pixels is specified as a pixel value in order to allow normalized correlations to be determined. One correlation value contribution rate map is defined for each positional relation between the template and the search image. However, the sum of the pixel values in the correlation value contribution rate map need not necessarily be the normalized correlation value for the corresponding positional relation. The pixel values in the correlation value contribution rate map may be conveniently determined. The size for which the normalized correlation is calculated corresponds to the size of the correlation value contribution rate map.

FIG. 11 shows that the template is smaller than the search image and that the normalized correlation is calculated for the size of the entire template. That is, the size of the correlation value contribution rate map is equal to the size of the template. When the value at each point in the normalized correlation map is defined as a correlation value for the correlation with the template obtained when the point is aligned with the upper left end of the template, the lower right end of the normalized correlation map matches the upper left end of the template placed on top of the search image so that the lower right end of the template is aligned with the lower right end of the search image. Thus, the size of the normalized correlation map area corresponds to the length and width of the template subtracted from the length and width, respectively, of the search image.

FIG. 12 shows that the normalized correlation is calculated only for a portion in which the template and the search image overlap when the template and the search image have similar sizes. That is, in this case, the size of the correlation value contribution rate map is equal to the size of the overlapping portion between the template and the search image. The size of the normalized correlation map area can be made equal to that of the search image by calculating the correlation value only for the overlapping portion. However, when the normalized correlation is calculated with the template shifted, the size of the overlapping area varies, thus varying the size of the correlation value contribution rate map depending on the position. If the minimum value of the size of the overlapping portion is allowed to correspond to one pixel, the size of the normalized correlation map is equal to that of the search image. If the size of the overlapping portion is one pixel, the normalized correlation value is always 1, which is nonsense.

<Correlation Value Contribution Rate Map Generation Process>

Figure 13:
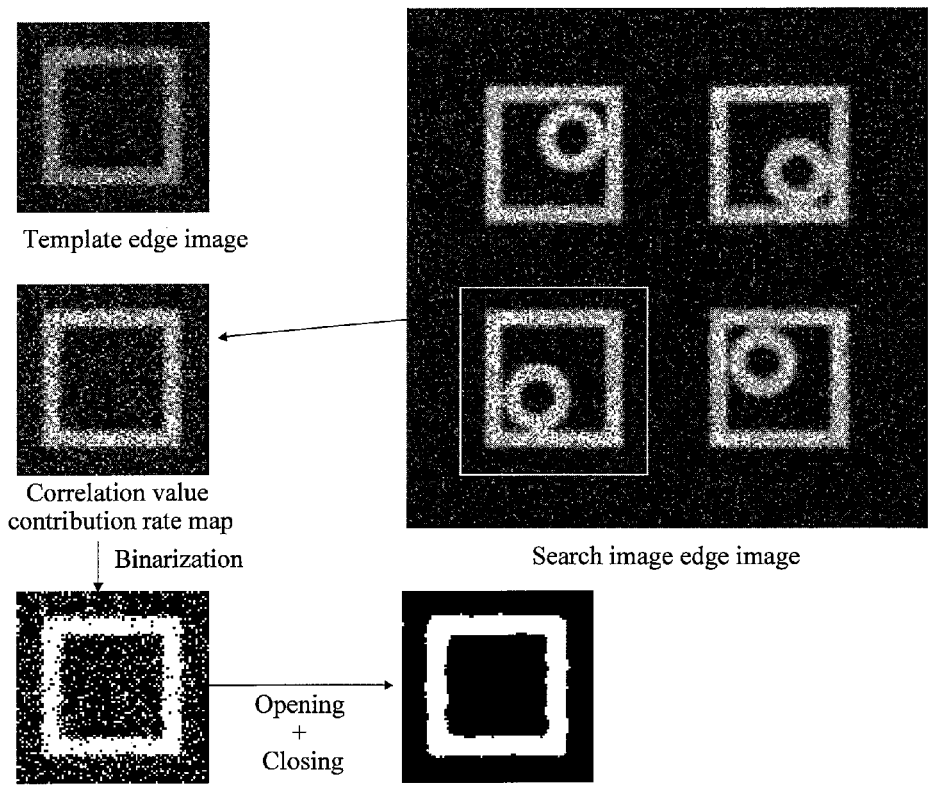
FIG. 13 is a diagram showing the principle of extraction of a common (or similar) pattern between an edge image of the template and an edge image of the search image.

FIG. 13 shows the principle of extraction of a common (or similar) pattern between a template edge image and a search edge image. It is assumed that the template edge image includes a square pattern and that the search image includes four similar patterns. The search image is further assumed to include a circular pattern inside each of the squares. A method of extracting square patterns similar to those in the template in this case will be described.

First, template matching is performed on the search image edge image using the template edge image as a template, to create correlation value contribution rate maps for top candidate positions. The correlation value contribution rate map is assumed to be such that a pixel with a high pixel value in both the template edge image and the search image edge image has a large value and such that a pixel with a low pixel value in at least one of the edge images has a low value. Such a correlation value contribution rate map includes almost no circular pattern present in the search image edge image. However, noise may accidentally exhibit a high pixel value in both images. Thus, even the correlation value contribution rate map may contain noise. The correlation value contribution rate map is binarized using an appropriate threshold value. The binarized correlation value contribution rate map is subjected to an opening and closing process. Then, only square patterns present in both the template edge image and the search image edge image are extracted. A common (or similar) pattern between a plurality of images is likely to be true. Hence, this method enables edges to be distinguished from noise to some degree.

Figure 14:
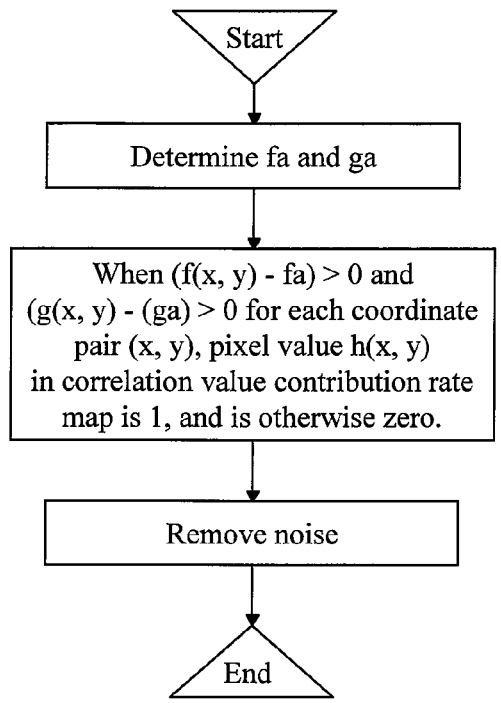
FIG. 14 is a diagram showing an example in which a correlation value contribution rate map for a binary image is created.

FIG. 14 shows an example in which a correlation value contribution rate map of a binary image is created. Reference character (f) denotes a template, and reference character (g) denotes a search image (both are actually edge images). Reference character f(x, y) denotes a pixel value for the template in terms of (x, y) coordinates. Reference character (h) denotes a correlation value contribution rate map. Reference characters fa and ga denote the average value of pixel values for the template and the average value of pixel values for the search image, respectively, both of which correspond to the size of the correlation value contribution rate map. However, these values need not exactly be average, but it is important that the pixel values other than those for the edges are smaller than the average value. If low-intensity edges are mixed in an image with high-intensity edges densely present therein, it may be safer to set the pixel value slightly smaller than the average value. In the binary image, when (f(x, y)−fa)>0 and (g(x, y)−ga)>0 for each coordinate pair (x, y), a pixel value h(x, y) in the correlation value contribution rate map is 1. Otherwise the pixel value h(x, y) is 0. Thus, a correlation value contribution rate map is generated.

Figure 15:
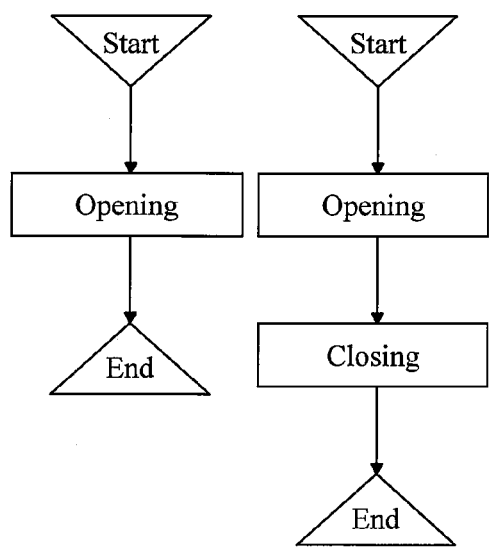
FIG. 15 is a diagram showing noise removal carried out if the correlation value contribution rate map is a binary image.

FIG. 15 is a diagram showing noise removal carried out if the correlation value contribution rate map is a binary image. The opening process contracts and then expands the image to allow white pixel noise against a black pixel background to be removed. The closing process expands and then contracts the image to allow black pixel noise against a white pixel background to be removed. One or both of the processes may be carried out depending on image quality. Depending on which of the closing and opening processes is carried out first, the result varies.

Figure 16:
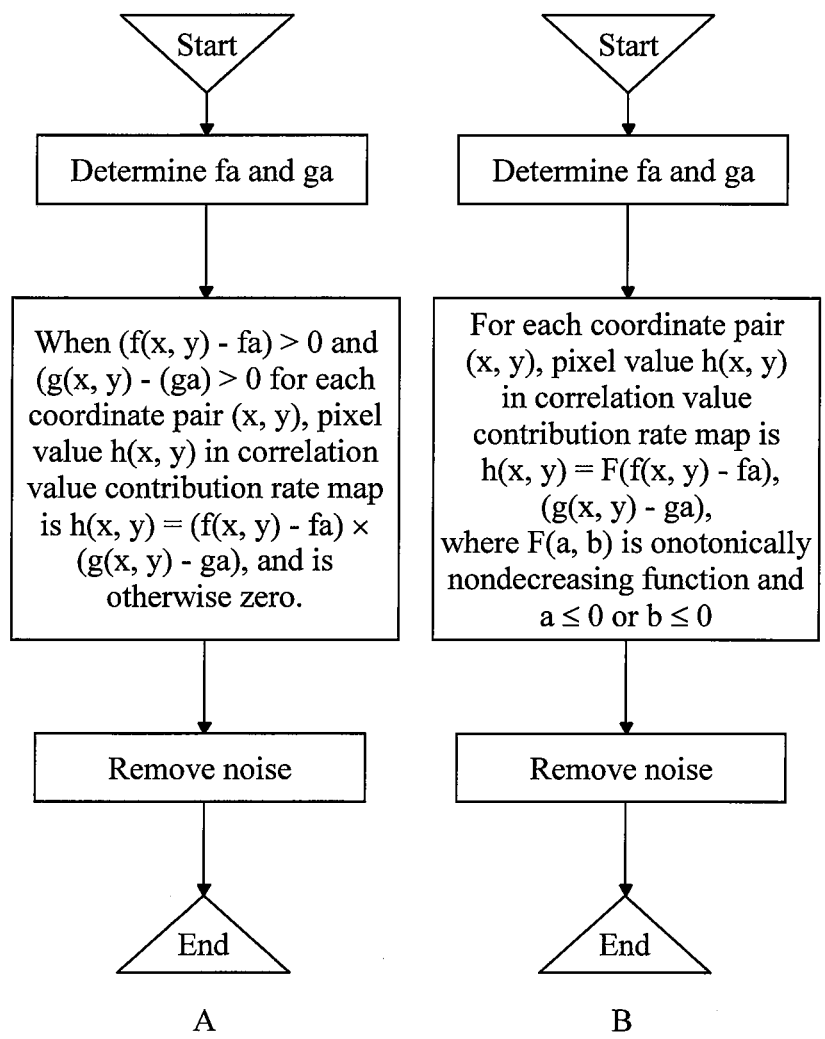
FIG. 16 is a diagram showing an example in which a correlation value contribution rate map of a gray scale is created.

FIG. 16 shows an example in which a correlation value contribution rate map of a gray scale is created. In FIG. 16A, when (f(x, y)−fa)>0 and (g(x, y)−ga)>0 for each coordinate pair (x, y), the pixel value h(x, y) in the correlation value contribution rate map is h(x, y)=(f(x, y)−fa)×(g(x, y)−ga). Otherwise the h(x, y) is 0. Also in this case, the pixel value is positive when f(x, y)>fa and g(x, y)>ga and is otherwise zero. This may be generalized as shown in FIG. 16B. For each coordinate (x, y), the pixel value h(x, y) in the correlation value contribution rate map is h(x, y)=F((f(x, y)−fa), (g(x, y)−ga)). In this case, F(a, b) is a monotonically nondecreasing function and is zero when a≦0 or b≦0. When the pixel values are expressed as a gray scale so as to be consecutive, if whether a pixel corresponds to an edge is doubtful, it is possible to directly evaluate the edge features of the pixel instead of determining whether or not the pixel corresponds to an edge.

Figure 17:
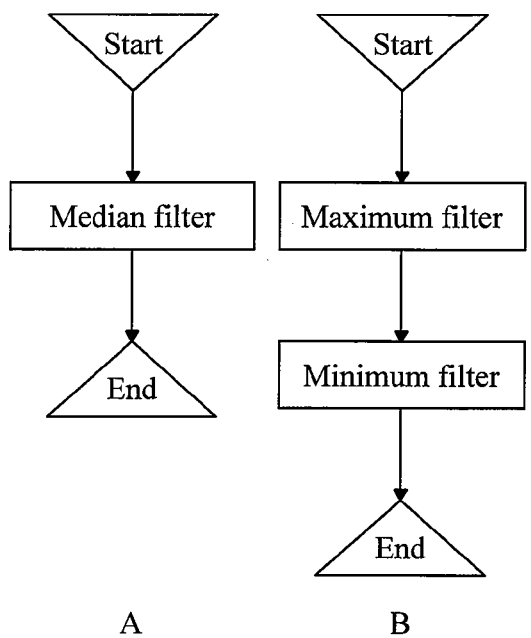
FIG. 17 is a diagram showing noise removal carried out if the correlation value contribution rate map is a gray scale.

FIG. 17 is a diagram showing noise removal carried out if the correlation value contribution rate map is a gray scale. The noise removal may involve the use of a median filter (see FIG. 17A) or a combination of a maximum filter and a minimum filter (see FIG. 17B). The median filter is effective for removing noise without blurring edges. Furthermore, the maximum filter provides a function similar to expansion of a binary image. The minimum filter provides a function similar to contraction of a binary image. A combination of the maximum filter and the minimum filter enables closing (elimination of recesses) and opening (elimination of ridges).

<Luminance Corrected Matching Process>

Figure 18:
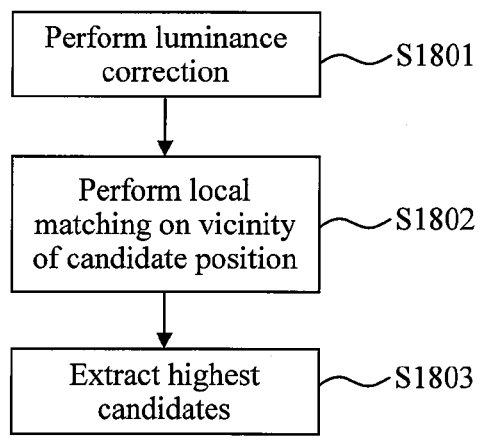
FIG. 18 is a diagram illustrating a luminance corrected matching process for each candidate position.

FIG. 18 is a diagram illustrating a process of luminance corrected matching for each candidate position, that is, a process of carrying out matching after performing luminance correction.

For each candidate position, the template edge image and the search image edge image are subjected to luminance correction based on the correlation value contribution rate map (step S1801). The luminance correction is performed over a range corresponding to the size of the correlation value contribution rate map. Thereafter, local matching is performed on this candidate position (step S1802). Here, the term "local" means matching over a range around the candidate position which is equivalent to the maximum value of a pattern distortion amount. In this case, the matching may fail to be completed only with the area subjected to the luminance correction. Then, the following measures may be taken. The portions not subjected to the luminance correction are treated without any change or only the portion subjected to the luminance correction is used based on such an idea as shown in FIG. 12 or a slightly smaller template is set. Finally, a position located around the candidate position and having the highest correlation value as well as its correlation value are extracted as the highest candidate (step S1803).

Figure 19:
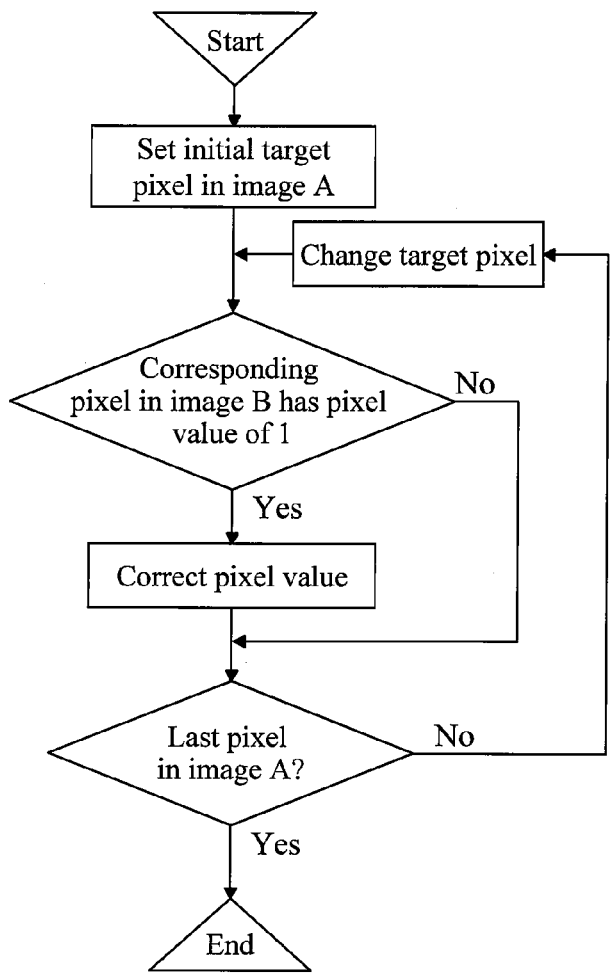
FIG. 19 is a flowchart illustrating luminance correction carried out if the correlation value contribution rate map is a binary image.

FIG. 19 is a flowchart illustrating the luminance correction performed if the correlation value contribution rate map is a binary image. Here, an image A refers to a portion of the template or search image which is located at the candidate position and which overlaps the correlation value contribution rate map. An image B refers to the correlation value contribution rate map. An initial target pixel is set in the image A. After processing for each pixel is finished, the target pixel is changed. This operation is repeated until all the pixels in the image A are processed. Normally, an initial target pixel is set at the upper left end, and the target pixel is sequentially shifted rightward and downward in order of scan lines. In the processing for each pixel, if the corresponding pixel in the image B has a pixel value of 1, the pixel value is corrected. Otherwise the pixel value is not corrected.

Figure 20:
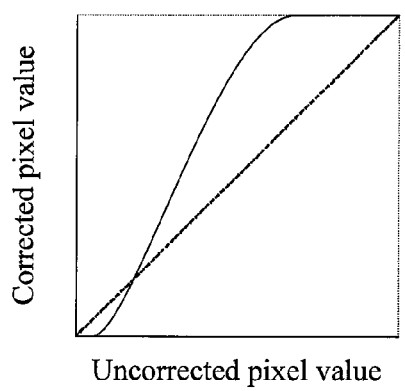
FIG. 20 is a diagram showing an example of the luminance correction.

In the actual correction of the pixel value, the pixel value is converted so as to increase the luminance value of a low-intensity edge position as shown in FIG. 20.

Figure 21:
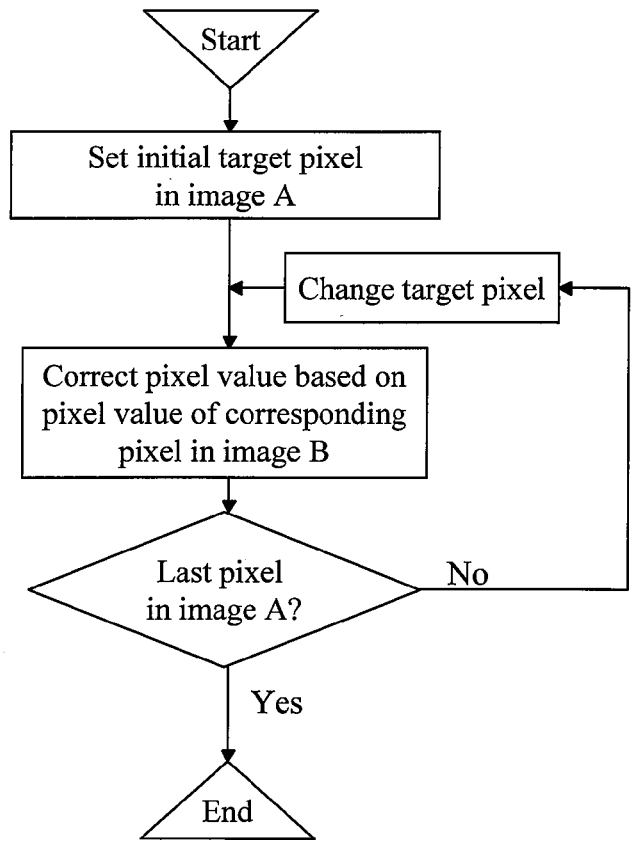
FIG. 21 is a flowchart illustrating luminance correction carried out if the correlation value contribution rate map is a gray scale.

FIG. 21 is a flowchart illustrating the luminance correction performed if the correlation value contribution rate map is a gray scale. The process procedure is the same as that for the binary image. However, the present procedure performs a correction corresponding to the value in the correlation value contribution rate map instead of determining whether or not to perform correction depending on the value in the correlation value contribution rate map.

Figure 22:
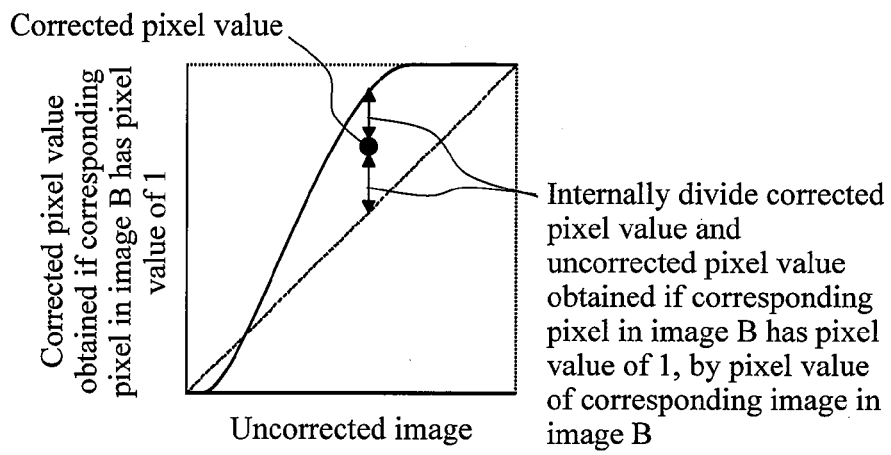
FIG. 22 is a diagram showing an example of the luminance correction.

FIG. 22 shows the specific contents of the luminance correction. No correction is performed on a position with a pixel value of 0 in the correlation value contribution rate map. The correction for a position with a pixel value of 1 in the correlation value contribution rate map is specified as shown in FIG. 20. For a position with an intermediate pixel value in the correlation value contribution rate map, a correction resulting from internal division by the intermediate pixel value is performed. In the description, the pixel value in the correlation value contribution rate map is normalized such that the maximum pixel value is 1.

Finally, the correlation values of the highest candidate positions located around each candidate position and having the highest correlation value are compared with one another. The candidates are thus re-sorted.

(2) Second Embodiment

<Configuration of the Inspection Apparatus>

Figure 23:
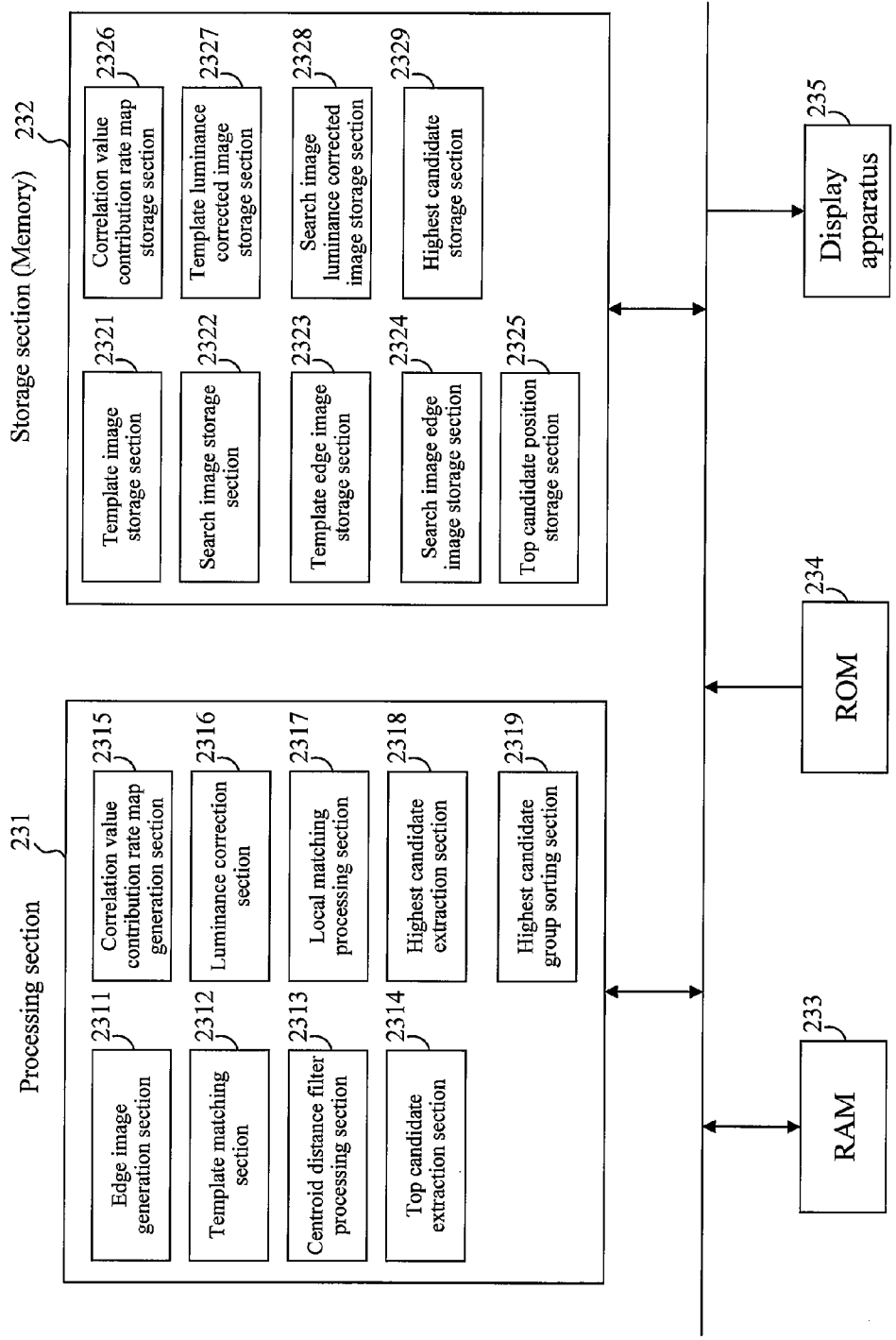
FIG. 23 is a diagram schematically showing the configuration of an inspection apparatus according to a second embodiment of the present invention.

FIG. 23 is a diagram schematically showing the configuration of an inspection apparatus 230 according to a second embodiment of the present invention. Like FIG. 5, FIG. 23 does not show the configuration of an electron microscope.

The inspection apparatus 230 includes a processing section 231 formed of, for example, an MPU or a CPU to carry out various processes, a storage section 232 which stores the results of processes carried out by the processing section 231, a RAM (Random Access Memory) 233 which, for example, temporarily stores data, a ROM (Read Only Memory) 234 which stores process programs and parameters for the processing section 231, and a display apparatus 235 which displays inspection results and images.

The processing section 231 includes an edge image generation section 2311 which generates edge images of a template image and a search image, a template matching section 2312 which performs template matching, a centroid distance filter processing section 2313 which processes the results (normalized correlation map) of the template matching process using a centroid distance filter, a top candidate extraction section 2314 which extracts a predetermined number of matching results with top normalized correlation values from template matching results, a correlation value contribution rate map generation section 2315 which generates correlation value contribution rate maps, a luminance correction section 2316 which performs luminance correction on the template image and search image based on the correlation value contribution rate maps, a local matching section 2317 which carries out a local matching process on the image subjected to the luminance correction for each position extracted as the top candidate, a local highest candidate extraction section 2318 which extracts the highest candidate in the local matching results, as the highest candidate, and a highest candidate group sorting section 2319 which sorts the obtained highest candidates to determine the final matching position.

The storage section 232 includes a template image storage section 2321 which stores a template image, a search image storage section 2322 which stores a search image, a template edge image storage section 2323 which stores a template edge image, a search image edge image storage section 2324 which stores an edge image of the search image, a top candidate position storage section 2325 which stores positional information on top candidates, a correlation value contribution rate map storage section 2326 which stores correlation value contribution rate maps, a template luminance corrected image storage section 2327 which stores the template image subjected to luminance correction, a search image luminance corrected image storage section 2328 which stores the search image subjected to luminance correction, and a highest candidate storage section 2329 which stores the highest candidate.

The edge image generation section 2311 acquires the template and the search image from the template image storage section 2321 and the search image storage section 2322, respectively, and creates edge images of the template and the search image.

The template matching section 2312 performs template matching on the edge image stored in the search image edge image storage section 2324, using the edge image stored in the template edge image storage section 2323 as a template.

The centroid distance filter processing section 2313 carries out a centroid distance filter process described below on a normalized correlation map.

The top candidate extraction section 2314 stores top ones of the candidates resulting from the template matching process, in the top candidate position storage section 2325.

The correlation value contribution rate map generation section 2315 creates a correlation value contribution rate map corresponding to each of the extracted top candidate positions. The correlation value contribution rate map generation section 2315 then stores the correlation value contribution rate map in the correlation value contribution rate map storage section 2326.

The luminance correction section 2316 creates a template luminance corrected image for each candidate from the correlation value contribution rate map and the edge image stored in the template edge image storage section 2323. The luminance correction section 2316 then stores the template luminance corrected image in the template luminance corrected image storage section 2327. Furthermore, the luminance correction section 2316 creates a search image luminance corrected image for each candidate from the correlation value contribution rate map and the edge image stored in the search image edge image storage section 2324. The luminance correction section 2316 then stores the search image luminance corrected image in the search image luminance corrected image storage section 2328.

The local matching section 2317 uses the template luminance corrected image as a template to perform local template matching on the search image luminance corrected image around the candidate position.

The highest candidate extraction section 2318 stores the highest candidate resulting from the local template matching, in the highest candidate storage section 2329 as the highest candidate.

The highest candidate sorting section 2319 re-sorts all the local highest candidates obtained for and located around each candidate to determine the final matching position.

<Contents of Operation of the Processing Section>

Figure 24:
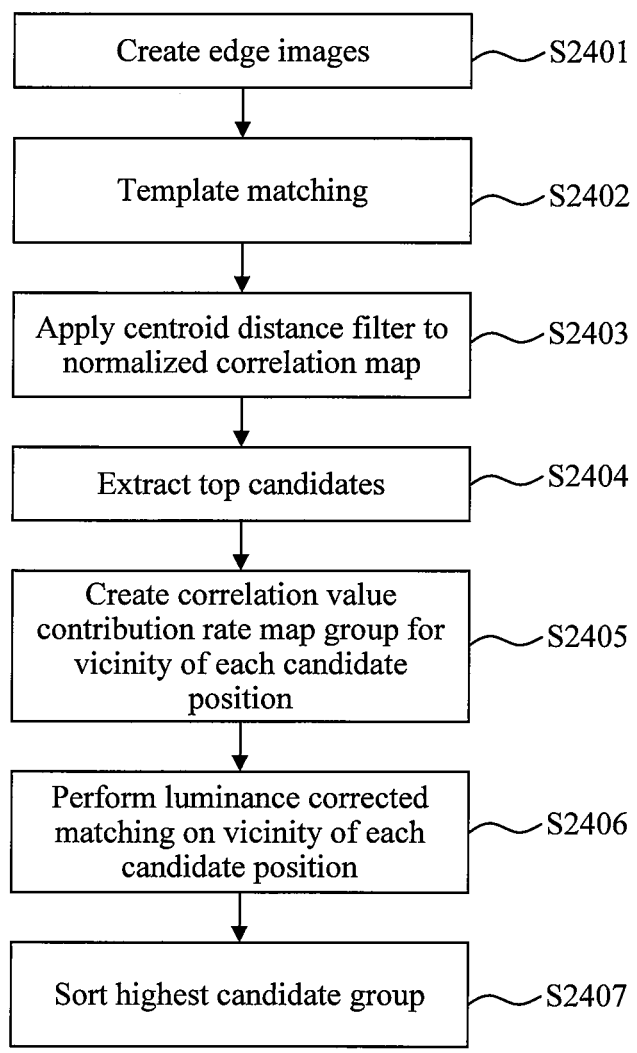
FIG. 24 is a flowchart illustrating a template matching process using a centroid position filter.

FIG. 24 is a flowchart illustrating a template matching process using a centroid position filter in brief. When the centroid position filter is used, the edge expansion process (see FIG. 7) according to the first embodiment is not required.

First, the edge image generation section 2311 creates edge images of a template and a search image (step S2401). The edge images are obtained by application of a filter with an edge extraction function such as a Sobel filter or a Laplacian filter.

Subsequently, the template matching section 2312 carries out a matching process between the template image and search image subjected to an expansion process (step S2402).

At this time, a correlation value (indicative of similarity) is obtained at a plurality of positions. Then, the centroid distance filter 2313 carries out a centroid distance filter process on a normalized correlation map (step S2403).

Subsequently, based on the results of the centroid distance filter process, the top candidate extraction section 2314 extracts those of the plurality of matching positions obtained which have correlation values larger than a predetermined value, as top candidates (step S2404).

The correlation value contribution rate map generation section 2315 generates a plurality of correlation value contribution rate maps for each of the top candidate positions (step S2405). The generation of the correlation value contribution rate map has been described in detail in the first embodiment. Since the edges have not been thickened, the correlation value contribution rate map may fail to contain effective information at any candidate position. Thus, correlation value contribution rate maps need to be created for an area around each candidate position which area is set with a pattern distortion amount taken into account.

Then, the luminance correction section 2316 performs luminance correction on the template and the search image based on the correlation value contribution rate maps. The local matching section 2317 performs pattern matching between the template and search image both subjected to the luminance correction (step S2406).

The local highest candidate extraction section 2318 determines the highest candidate resulting from the local template matching to be the highest candidate. The highest candidate sorting section 2319 re-sorts all the local highest candidates obtained for and located around each candidate to determine the final matching position (step S2407).

The centroid distance filter process and the luminance corrected matching process will be mainly described below. The template matching process and the correlation value contribution rate map generation process are similar to those in the first embodiment and thus will not be described.

<Centroid Distance Filter Process>

Figure 25:
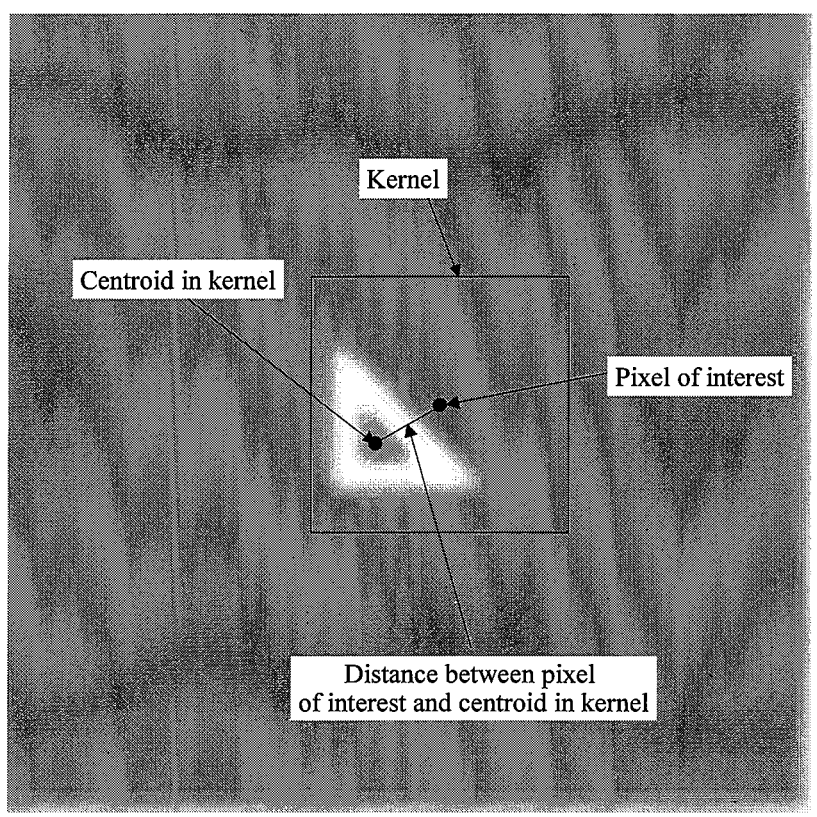
FIG. 25 is a diagram illustrating the concept of a centroid distance filter.

FIG. 25 is a diagram illustrating the concept of a centroid distance filter. As described above with reference to FIG. 2, if the pattern is distorted, a certain level of distortion is tolerated by thickening the edges. However, the distortion can be tolerated by using the centroid distance filter without the need to thicken the edges.

The centroid distance filter includes a predetermined kernel (a range for a filter operation) around a pixel of interest to calculate the centroid within the kernel. A value corresponding to the distance between the pixel of interest and the centroid is set to be a new pixel value for the pixel of interest. The pixel value decreases with increasing distance. The new pixel value of the pixel of interest is proportional to the sum of the pixel values in the kernel when the distance is zero and is generally obtained by multiplying the current pixel value by a coefficient that decreases with increasing distance.

Figure 26:
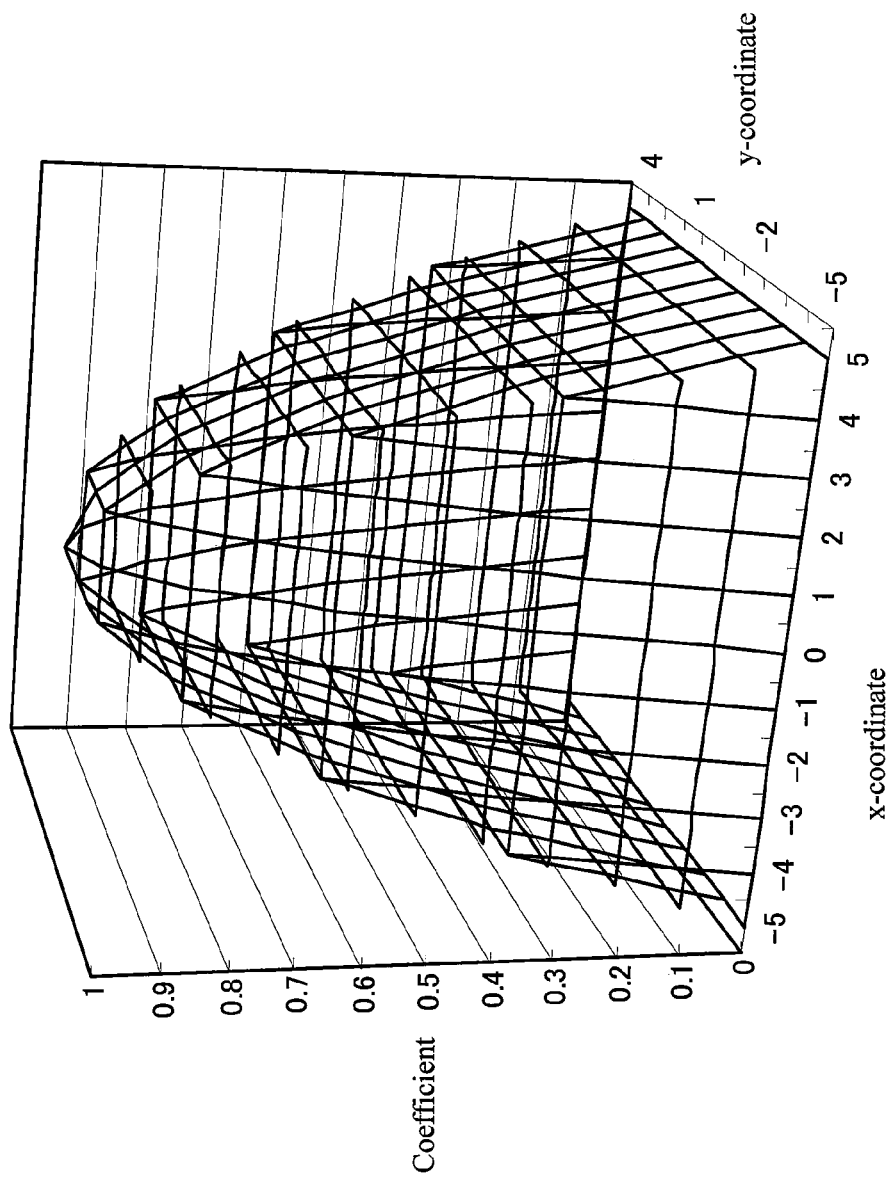
FIG. 26 is a diagram showing an example of the relationship between a distance and a coefficient therefor for the centroid distance filter.

FIG. 26 shows an example of the relationship between the distance and the coefficient therefor. The coefficient is 1 if the centroid is present at the position where the (x) and (y) coordinates are both zero relative to the position of the pixel of interest. The coefficient decreases with increasing distance between the centroid and the position (0, 0) and down to zero.

Figure 27:
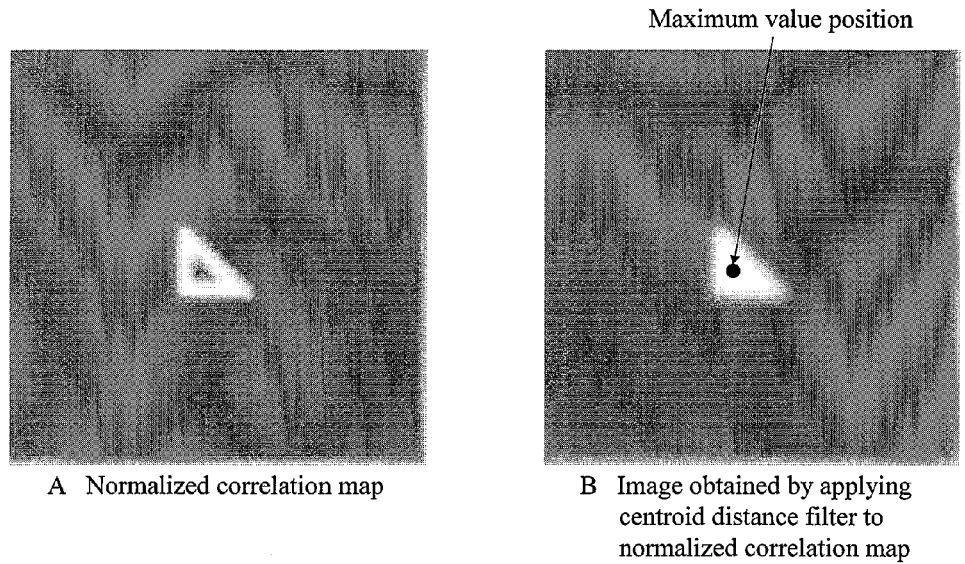
FIG. 27 is a diagram showing a normalized correlation map obtained if edges in edge images of a template and a search image of a triangle (FIG. 27A) are not thickened and the normalized correlation map to which the centroid distance filter is applied (FIG. 27B).
Figure 28:
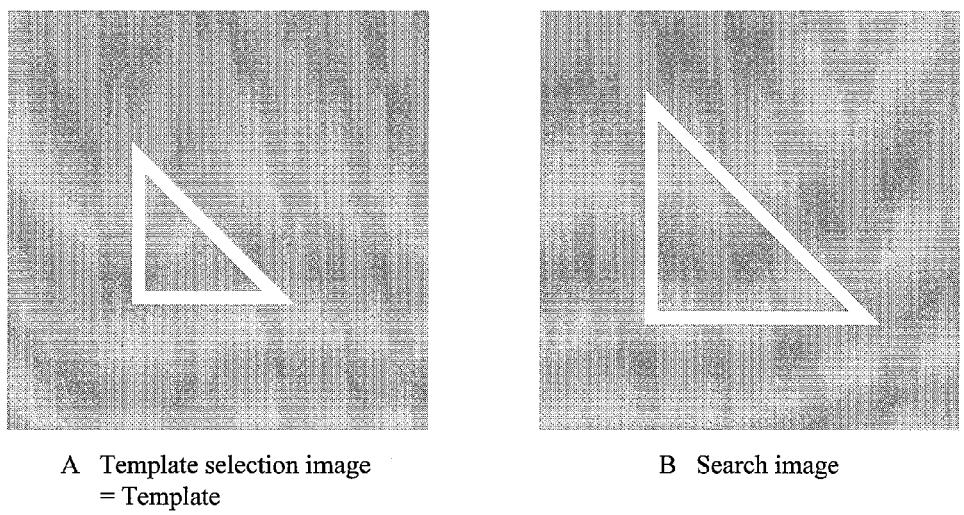
FIG. 28 is a diagram showing the edge images of the template and search image of the triangle.

FIG. 27 shows a normalized correlation map obtained if the edges in edge images of a template and a search image of a triangle shown in FIG. 28 are not thickened (FIG. 27A) and the normalized correlation map subjected to the centroid distance filter (FIG. 27B). In FIG. 27A, the matching position fails to align with the center of the triangle. In FIG. 27B, the maximum value position is present at the center of the triangle and can be aligned with the center of distortion. Moreover, if the edges are thickened, the degree to which the edges are to be thickened is not clear. However, if the centroid distance filter is used, the maximum value of the pattern distortion amount may be set to be the kernel size.

<Luminance Corrected Matching Process>

Figure 29:
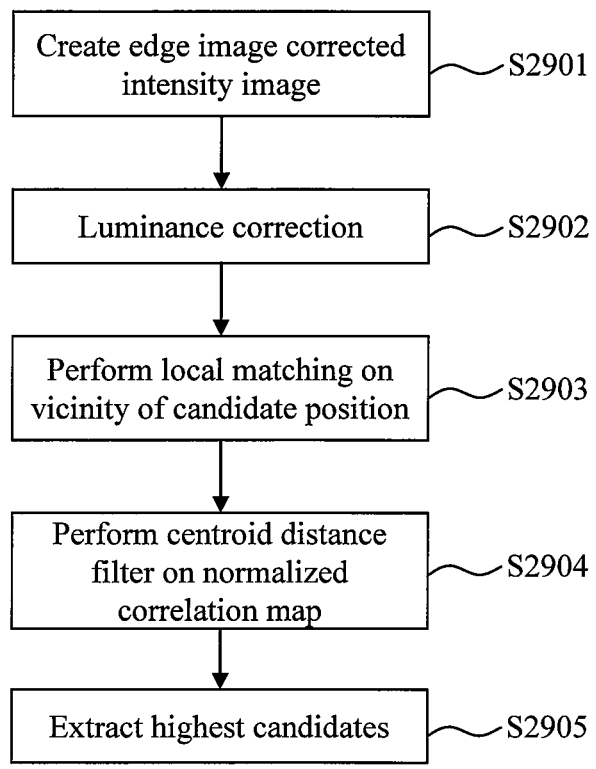
FIG. 29 is a flowchart illustrating a luminance corrected matching process for each candidate position in brief.

FIG. 29 is a flowchart illustrating a luminance corrected matching process for each candidate position in brief.

First, for each candidate position, the luminance correction section 2316 creates an edge image corrected intensity image for each of the template and the search image (step S2901). That is, a group of a plurality of correlation value contribution rate maps created around each candidate position is present for the candidate position as described above. An edge image corrected intensity image for the template or the search image is generated from the correlation value contribution rate map groups.

Furthermore, the luminance correction section 2316 performs luminance correction based on the edge image corrected intensity images of the template and the search image (step S2902). This process is similar to the process of thickening edges in the luminance correction in FIG. 18. The process will be described below in detail.

Subsequently, the local latching processing section 2317 performs local matching on the vicinity of each candidate position (step S2903). This is also similar to the local matching process in FIG. 18.

Then, the centroid distance filter processing section 2313 carries out a centroid distance filter process on normalized correlation maps obtained by the local matching process (step S2904). Finally, the highest candidate extraction section 2318 extracts and sorts the highest candidates (step S2905). This is also similar to that shown in FIG. 18.

Now, a method of creating a corrected intensity image from a correlation value contribution rate map group will be described with reference to FIGS. 30 to 32.

FIGS. 30 and 31 are diagrams showing correlation value contribution rate maps created by using a large ring-shaped edge and a small ring-shaped edge as a template and a search image, respectively, and shifting relative positions around a first candidate position. In FIGS. 30 and 31, black portions show edge portions in both the template and the search image. At the center of the first candidate position, the edges fail to overlap, and the correlation value contribution rate map fails to exhibit a high value. However, as the relative positions of the template and the search image are shifted within the range of the pattern distortion, the edges start to overlap. FIG. 30 shows that as the relative positions are shifted, the larger ring remains always at the center. That is, FIG. 30 shows a coordinate system in which the position of the template is fixed to the center of the correlation value contribution rate map. On the other hand, FIG. 31 shows that the smaller ring is always located at the center. That is, FIG. 31 shows a coordinate system in which the position of the search image is fixed to the center of the correlation value contribution rate map.

In FIG. 30, when the correlation value contribution rate maps are laid on top of one another (the pixel values of the corresponding pixel are added together), such a large ring as shown in FIG. 30B appears. This is a corrected intensity image for the template. Furthermore, in FIG. 31, when the correlation value contribution rate maps are laid on top of one another, such a small ring as shown in FIG. 31B appears. This is a corrected intensity image for the search image.

As described above, when the template and the correlation value contribution rate map are laid on top of each other with the relative positions thereof fixed, a corrected intensity image for the template is generated. When the search image and the correlation value contribution rate map are laid on top of each other with the relative positions thereof fixed, a corrected intensity image for the search image is generated. When the edges are to be thickened, even if pattern distortion occurs between the template and the search image, luminance correction needs to be performed based on one correlation value contribution rate map. However, when the centroid distance filter is used, since a corrected intensity image can be created for each of the template and the search image, accurate luminance correction can be achieved.

Figure 33:
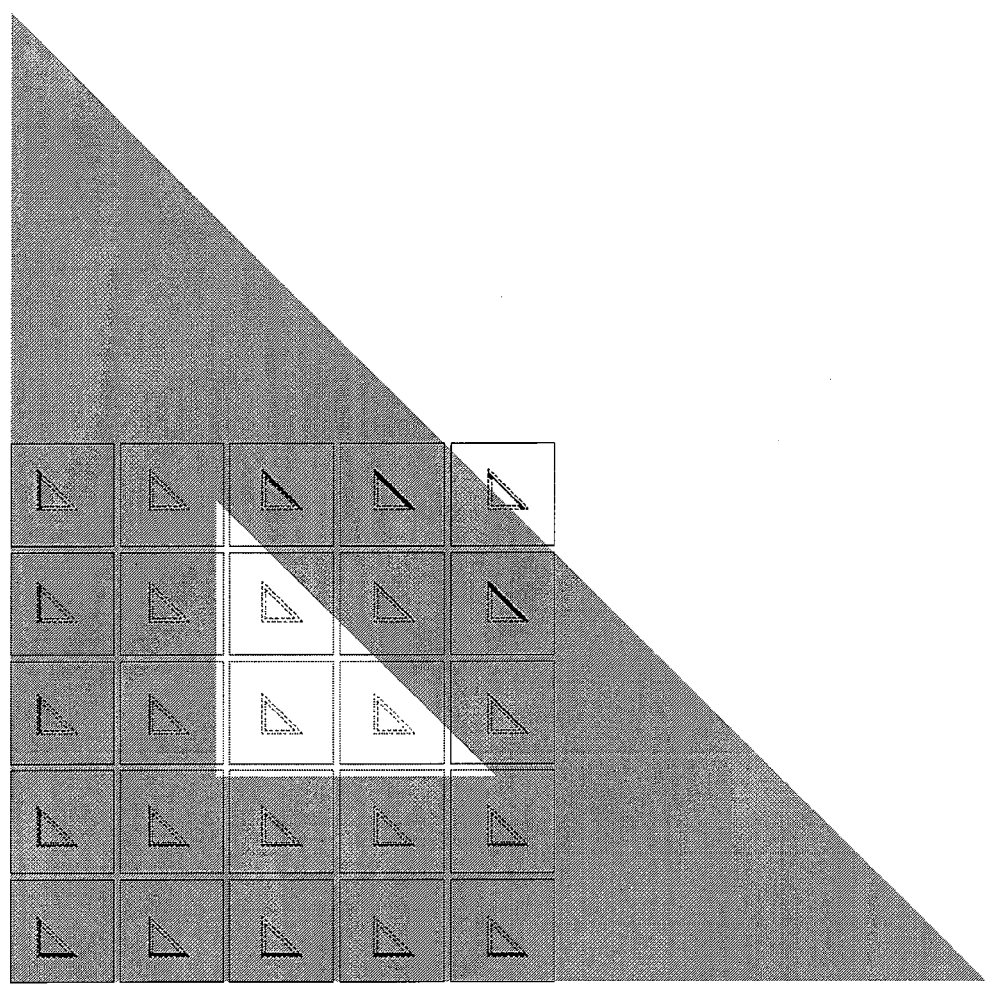
FIG. 33 is a diagram showing a correlation value contribution rate map group (2) for a first candidate position in a template with a small triangular edge and a search image with a large triangular edge.

FIGS. 32 and 33 both show a correlation value contribution rate map group for a first candidate position in a template with a small triangular edge and a search image with a large triangular edge. In both FIGS. 32 and 33, the coordinates in the search image are fixed. Thus, when the images are laid on top of one another, a corrected intensity image for the search image with the large triangle is obtained. On the other hand, a hatched, gray triangle in FIG. 33 schematically shows the sums of the pixel values in the correlation value contribution rate maps arranged for the respective coordinates in the template with the coordinates in the search image fixed.

As described above, the corrected intensity image is obtained by fixing the coordinates in the correlation value contribution rate map and projecting the pixel values in the correlation value contribution rate map group, which is a four-dimensional image (in which two-dimensional images are two-dimensionally arranged). Furthermore, the normalized correlation map (which has values different from those in the corrected intensity image but is shaped like the corrected intensity image) is obtained by fixing the relative position of the template and projecting the pixel values in the correlation value contribution rate map group.

Here, the normalized correlation is calculated as follows.

$$\text{Given } E_f = \frac{1}{N_1 \times N_2} \sum_{n_1 n_2} f(n_1, n_2) \quad \text{[Expression 1]}$$

for images f(n1, n2) and g(n1, n2) both with a size of N2×N2, the normalized correlation is calculated to be $$\frac{\sum_{n_1 n_2} (f(n_1, n_2) - E_f)(g(n_1, n_2) - E_g)}{\sqrt{\sum_{n_1 n_2} (f(n_1, n_2) - E_f)^2} \sqrt{\sum_{n_1 n_2} (g(n_1, n_2) - E_g)^2}}.$$

Here, $0 \leq n1 \leq N1-1$ and $0 \leq n2 \leq N2-1$, and $$\sum_{n_1 n_2} \text{ indicates } \sum_{n_1=0}^{N_1-1} \sum_{n_2=0}^{N_2-1}.$$

N1×N2 denotes the size of the template. f and g denote the template and the target area.

(3) Conclusion

According to the first embodiment of the present invention, a correlation value contribution rate map is created for each of the top candidates for the matching position obtained by the template matching between the edge images with the edges thickened by the edge expansion process. The luminance correction is performed based on the correlation value contribution rate map. The local matching is performed again on the vicinity of each candidate. The candidates are re-sorted based on the candidate positions and correlation values newly obtained. Thus, when the luminance correction is performed using the correlation value contribution rate map, even if the image includes a distorted pattern shape and a variation in edge intensity, the adequate matching position can be provided in a unified manner.

Furthermore, according to the second embodiment, correlation value contribution rate maps are created for the vicinity of each of the top candidate positions obtained by applying the centroid distance filter to the normalized correlation map obtained by the template matching between the non-thickened edge images (not subjected to the edge expansion process). A corrected intensity image is created from the correlation value contribution rate maps. The luminance correction is performed based on the corrected intensity image. The local matching is performed on the vicinity of each candidate position. Then, the candidates are re-sorted based on the candidate positions and correlation values newly obtained. Thus, as is the case with the first embodiment, even if the image includes a distorted pattern shape and a variation in edge intensity, the adequate matching position can be provided in a unified manner.

The present invention can be implemented by software program codes which realize the functions of the embodiments. In this case, a storage medium in which the program codes are recorded is provided to a system or an apparatus. A computer (or a CPU or an MPU) in the system or apparatus then reads the program codes stored in the storage medium. In this case, the program codes themselves read from the storage medium realize the functions of the above-described embodiments. The program codes themselves and the storage medium storing the program codes form the present invention. The storage medium configured to supply the program codes may be, for example, a flexible disk, a CD-ROM, a DVD-ROM, a hard disk, an optical disk, a magnetooptic disk, a CD-R, a magnetic tape, a nonvolatile memory card, or a ROM.

Alternatively, based on instructions in the program codes, for example, an OS (Operating System) operating on the computer may carry out a part or all of the actual processing so as to implement the functions of the above-described embodiments. Moreover, the following method is also possible. The program codes read from the storage medium are written to a memory on the computer. Then, based on the instructions in the program codes, for example, the CPU in the computer carries out a part or all of the actual processing so as to implement the functions of the above-described embodiments.

Alternatively, the software program codes which realize the functions of the embodiments may be distributed via a network and stored in storage means of the system or apparatus such as a hard disk or a memory or a storage medium such as a CD-RW or a CD-R. Then, when the program codes are used, the computer (or CPU or MPU) in the system or apparatus may read and execute the program codes stored in the storage means or the storage medium.

The invention claimed is:

1. An image inspection apparatus which acquires a template and a search image and performs template matching on the search image, the apparatus comprising:
   a computer; and
   a non-transitory storage medium which stores a control program, wherein:
   the control program, when executed by the computer, causes the computer to function as:
   an edge image generation section which generates edge images of the template and the search image;
   a template matching processing section which performs template matching using the edge images of the template and the search image;
   a correlation value contribution rate map generation section which generates a correlation value contribution rate map indicating a portion contributing to achieving similarity between the template and the search image, for each of candidate positions in a plurality of matching results obtained by the template matching;

a luminance correction section which corrects luminance of the template and the search image based on the correlation value contribution rate maps;

a local matching processing section which performs local matching again on a vicinity of each of the candidate positions in the matching results using the template and search image subjected to the luminance correction; and a sorting processing section which sorts the plurality of matching results based on the candidate positions and correlation values newly obtained by the local matching process, and the correlation value contribution rate map generation section generates a correlation value contribution rate map indicating a portion of each of the edge images of the template and the search image which has a pixel value equal to or larger than a predetermined value.

2. The image inspection apparatus according to claim 1, wherein:

the program further causes the computer to function as an edge expansion processing section which carries out an expansion process on the edge images of the template and the search image, and the template matching processing section performs the template matching using the template and search image subjected to the edge expansion process.

3. The image inspection apparatus according to claim 1 or claim 2, wherein the correlation value contribution rate map generation section selects a predetermined number of the plurality of matching results which have top normalized correlation values, to generate the correlation value contribution rate map.

4. The image inspection apparatus according to claim 1, wherein:

in the correlation value contribution rate map, a pixel in a portion contributing to the similarity indicates a first value, and a pixel in a portion irrelevant to the similarity indicates a second value, and the luminance correction section corrects the pixel value indicative of the first value in the correlation value contribution rate map to increase the luminance of edge portions in the template and search image which portions have low luminance.

5. An image inspection apparatus which acquires a template and a search image and performs template matching on the search image, the apparatus comprising:

a computer; and a non-transitory storage medium which stores a control program, wherein:

the control program, when executed by the computer, causes the computer to function as:

an edge image generation section which generates edge images of the template and the search image;

a template matching processing section which performs template matching using the edge images of the template and the search image;

a centroid distance filter processing section which carries out a centroid distance filter process on a normalized correlation map obtained by the template matching;

a top candidate extraction section which extracts, from results of the centroid distance filter process, candidate positions shown to have normalized correlation values higher than a predetermined value in a plurality of matching results obtained by the template matching;

a correlation value contribution rate map generation section which generates, for each of the candidate positions, a correlation value contribution rate map indicating a portion contributing to achieving similarity between the template and the search image;

a luminance correction section which corrects luminance of the template and the search image based on the correlation value contribution rate maps;

a local matching processing section which performs local matching again on a vicinity of each of the candidate positions in the matching results using the template and search image subjected to the luminance correction; and a sorting processing section which sorts the plurality of matching results based on the candidate positions and correlation values newly obtained by the local matching process, and the correlation value contribution rate map generation section generates a correlation value contribution rate map indicating a portion of each of the edge images of the template and the search image which has a pixel value equal to or larger than a predetermined value.

6. The image inspection apparatus according to claim 5, wherein:

in the correlation value contribution rate map, a pixel in a portion contributing to the similarity indicates a first value, and a pixel in a portion irrelevant to the similarity indicates a second value, and the luminance correction section corrects the pixel value indicative of the first value in the correlation value contribution rate map to increase the luminance of edge portions in the template and search image which portions have low luminance.

* * * * *